United States Patent
Long

(10) Patent No.: US 11,493,651 B2
(45) Date of Patent: *Nov. 8, 2022

(54) CROSS-LINE SOURCE SEPARATION BASED ON CROSS-LINE STREAMER SEPARATION

(71) Applicant: PGS Geophysical AS, Oslo (NO)

(72) Inventor: Andrew Samuel Long, West Perth (AU)

(73) Assignee: PGS Geophysical AS, Oslo (NO)

( * ) Notice: Subject to any disclaimer, the term of this patent is extended or adjusted under 35 U.S.C. 154(b) by 749 days.

This patent is subject to a terminal disclaimer.

(21) Appl. No.: 16/426,437

(22) Filed: May 30, 2019

(65) Prior Publication Data

US 2019/0277987 A1 Sep. 12, 2019

Related U.S. Application Data

(63) Continuation of application No. 15/617,075, filed on Jun. 8, 2017, now Pat. No. 10,324,203.

(Continued)

(51) Int. Cl.
*G01V 1/00* (2006.01)
*G01V 1/28* (2006.01)
(Continued)

(52) U.S. Cl.
CPC .............. *G01V 1/001* (2013.01); *G01V 1/00* (2013.01); *G01V 1/28* (2013.01); *G01V 1/36* (2013.01);
(Continued)

(58) Field of Classification Search
CPC . G01V 1/00; G01V 1/001; G01V 1/28; G01V 1/36; G01V 1/38; G01V 1/3808; G01V 1/3817; G01V 1/3835; G01V 1/3843; G01V 1/3861; G01V 2210/10; G01V 2210/1293; G01V 2210/1423
(Continued)

(56) References Cited

U.S. PATENT DOCUMENTS

| 5,771,202 A | 6/1998 | Bale et al. |
| 7,916,576 B2 | 3/2011 | Beasley et al. |

(Continued)

FOREIGN PATENT DOCUMENTS

| EP | 2508918 | 10/2012 |
| GB | 2517071 | 2/2015 |

OTHER PUBLICATIONS

"Principles of Streamer Overlap Shooting"; Tech Link, A Publication of PGS Geophysical, vol. 5, No. 10, Oct. 2005 (4 pgs) https://www.pgs.com/globalassets/technical-library/whitepapers-library/principles-of-streamer-overlap-shooting-01-october-2005.pdf.

(Continued)

*Primary Examiner* — Daniel L Murphy

(57) ABSTRACT

A method for a marine seismic survey can include towing streamers that are spaced apart in a cross-line direction by a streamer separation (L) and towing seismic source elements that are spaced apart in the cross-line direction by a source separation based on an integer (k), an inverse of a quantity of the seismic source elements (1/S), and the streamer separation as represented by (k+1/S)L. The seismic source elements can be actuated and seismic signals can be detected at each of a plurality of receivers on the streamers.

19 Claims, 18 Drawing Sheets

Related U.S. Application Data

(60) Provisional application No. 62/434,244, filed on Dec. 14, 2016.

(51) Int. Cl.
*G01V 1/36* (2006.01)
*G01V 1/38* (2006.01)

(52) U.S. Cl.
CPC .............. *G01V 1/38* (2013.01); *G01V 1/3808* (2013.01); *G01V 1/3817* (2013.01); *G01V 1/3835* (2013.01); *G01V 1/3861* (2013.01)

(58) Field of Classification Search
USPC .......................................................... 367/16
See application file for complete search history.

(56) References Cited

U.S. PATENT DOCUMENTS

| | | |
|---|---|---|
| 8,730,760 B2 | 5/2014 | Cambois et al. |
| 10,324,203 B2 * | 6/2019 | Long ................... G01V 1/001 |
| 2006/0050611 A1 | 3/2006 | Borresen |
| 2012/0048642 A1 | 3/2012 | Hopperstad et al. |
| 2013/0250720 A1 | 9/2013 | Monk et al. |
| 2014/0121977 A1 | 5/2014 | Lecocq |

OTHER PUBLICATIONS

Search Report for related GB Application No. 1720777.0, dated Jun. 13, 2018 (3 pgs).

Hager, et al., "Efficient multi-source and multi-streamer configuration for dense cross-line sampling"; 2015 SEG New Orleans Annual Meeting (5 pgs).

Polarcus; "XArray: Controlled Soundfield Sampling"; Aug. 2015, vol. 2 (8 pgs).

Vinje, et al., "Shooting Over the Seismic Spread," First Break vol. 35, pp. 97-104 (Eage, Jun. 2017).

"TopSeis—The Tailor Made Solution for Subsurface Exploration and Development in the Barents Sea," 44 pages (CGG, Apr. 2017).

"Sabah MC3D," 5 pages (PGS, Oct. 2015).

Brice, et al., "Wide-Tow Source Configurations for Towed Multimeasurement Streamer Acquisition," SEG Technical Program Expanded Abstracts 2015, 4 pages (SEG Aug. 24, 2015).

\* cited by examiner

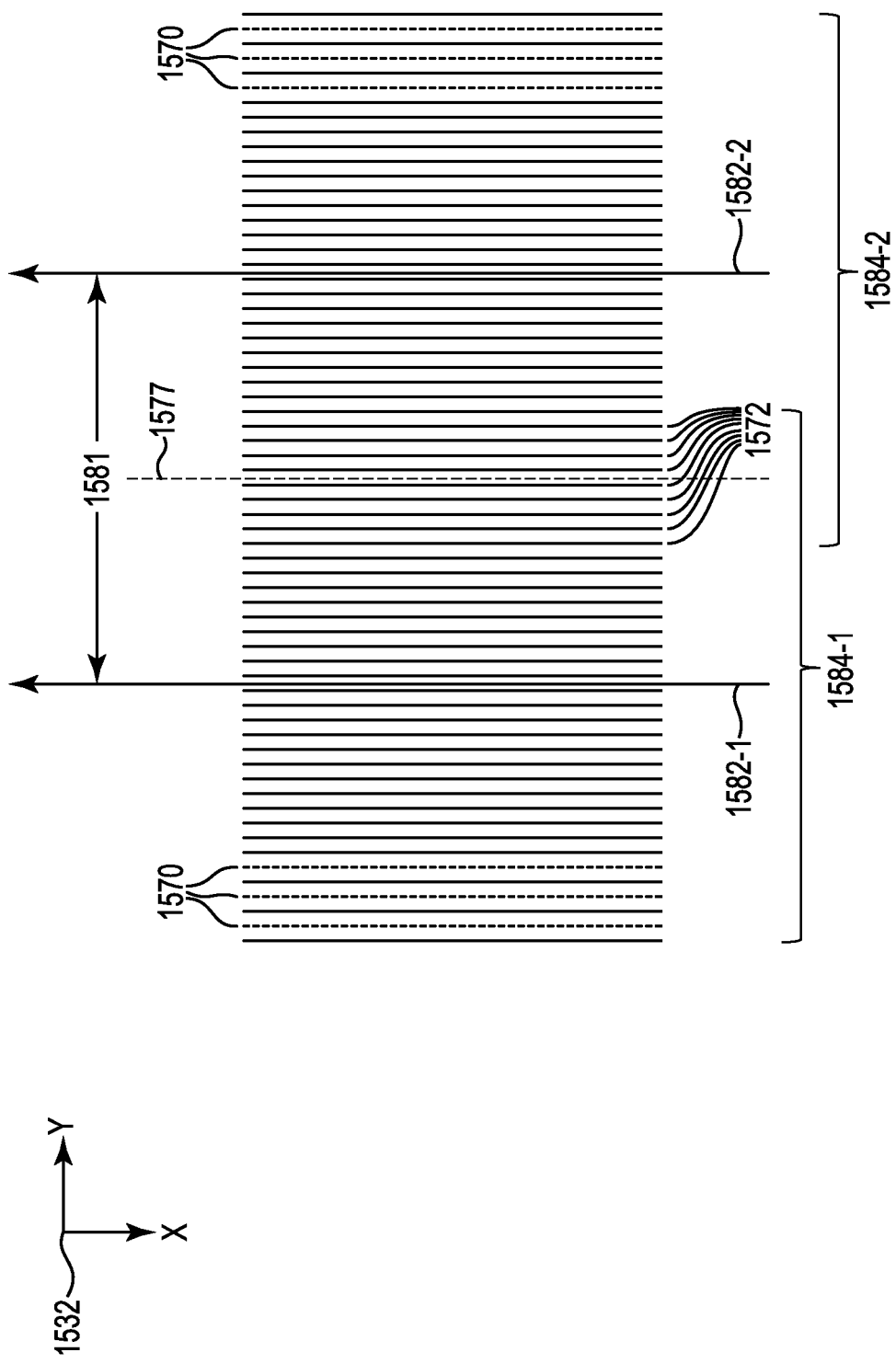

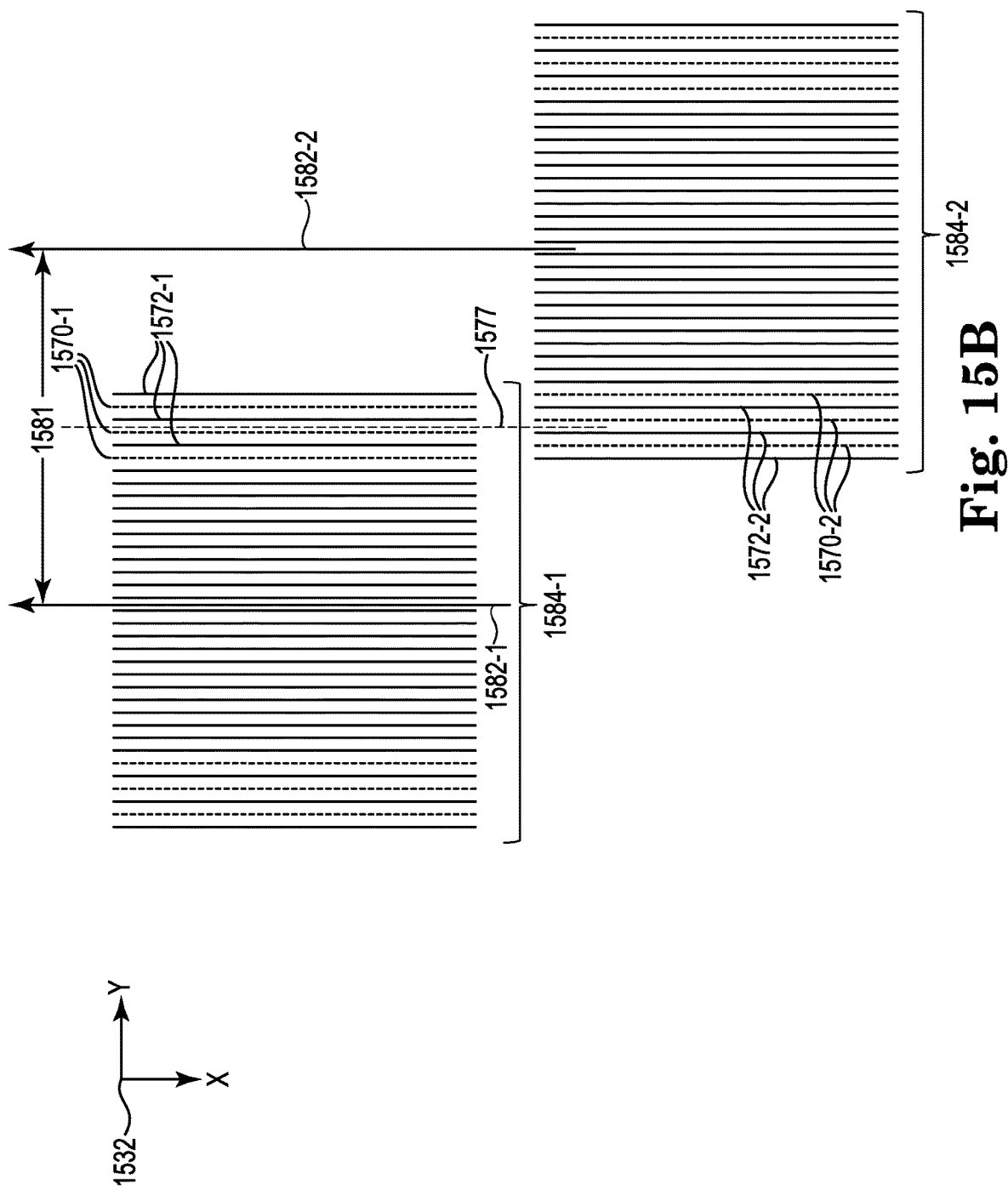

CROSS-LINE SOURCE SEPARATION BASED ON CROSS-LINE STREAMER SEPARATION

CROSS-REFERENCE TO RELATED APPLICATIONS

This application is a continuation of U.S. Non-Provisional application Ser. No. 15/617,075, filed Jun. 8, 2017 and published as U.S. Publication No. 2018-0164450 A1 on Jun. 14, 2018, which claims priority to U.S. Provisional Application 62/434,244, filed Dec. 14, 2016, which is incorporated by reference as if entirely set forth herein.

BACKGROUND

In the past few decades, the petroleum industry has invested heavily in the development of marine seismic survey techniques that yield knowledge of subterranean formations beneath a body of water in order to find and extract valuable mineral resources, such as oil. High-resolution images of a subterranean formation are helpful for quantitative interpretation and improved reservoir monitoring. For a typical marine seismic survey, a marine survey vessel tows one or more sources below the water surface and over a subterranean formation to be surveyed for mineral deposits. Receivers may be located on or near the seafloor, on one or more streamers towed by the marine survey vessel, or on one or more streamers towed by another vessel. The marine survey vessel typically contains marine survey equipment, such as navigation control, source control, receiver control, and recording equipment. The source control may cause the one or more sources, which can be air guns, marine vibrators, electromagnetic sources, etc., to produce signals at selected times. Each signal is essentially a wave called a wavefield that travels down through the water and into the subterranean formation. At each interface between different types of rock, a portion of the wavefield may be refracted, and another portion may be reflected, which may include some scattering, back toward the body of water to propagate toward the water surface. The receivers thereby measure a wavefield that was initiated by the actuation of the source.

BRIEF DESCRIPTION OF THE DRAWINGS

FIG. 15A illustrates a plan (yz-plane) view of sublines for two adjacent sail lines where the cross-line sail line separation is such that there is overlap of the sublines.

FIG. 15B illustrates a plan (yz-plane) view of sublines for two adjacent sail lines where the cross-line sail line separation is such that there is overlap of the sublines.

DETAILED DESCRIPTION

Figure 1:
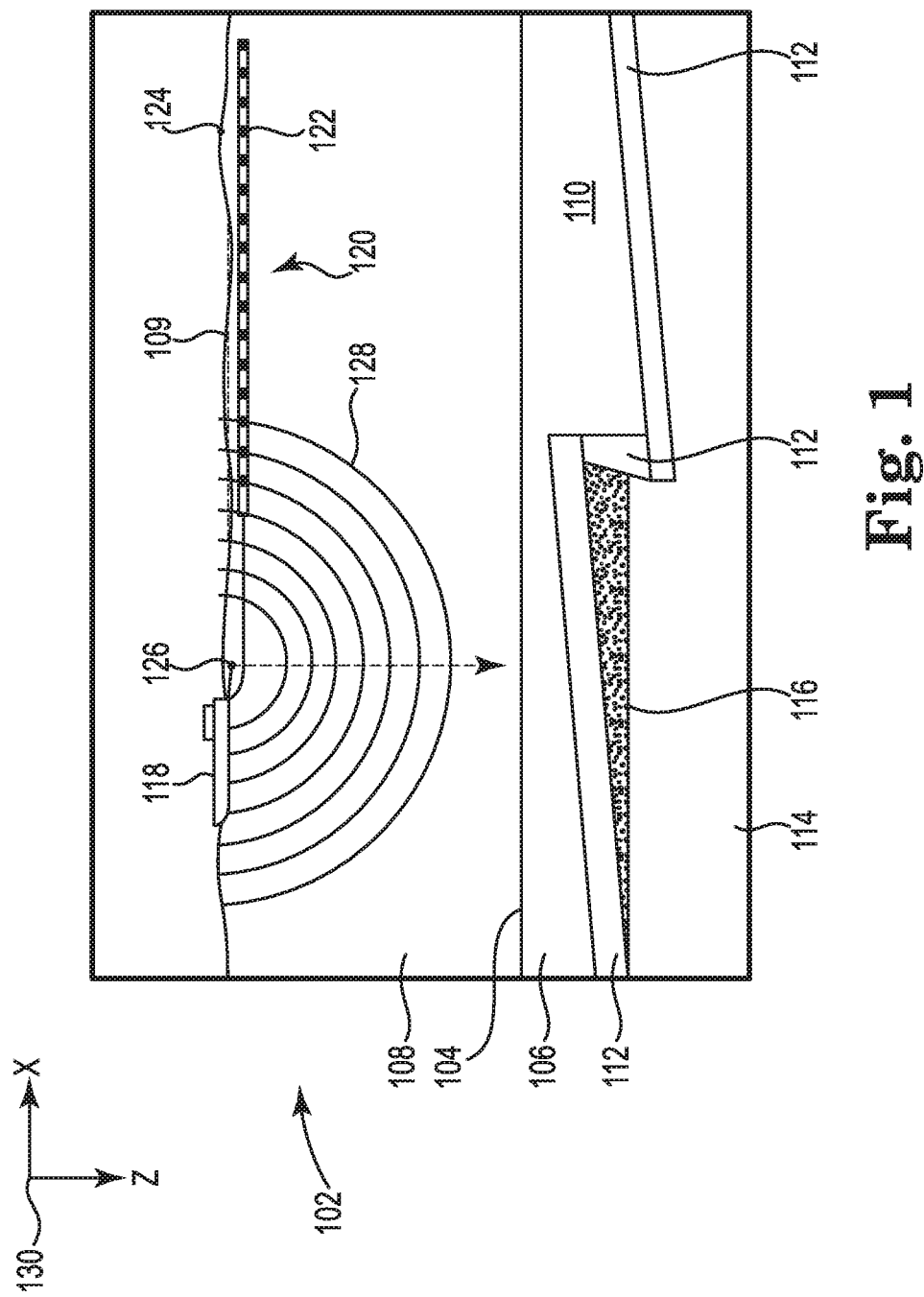
FIG. 1 illustrates a front or rear (xz-plane) view of marine seismic surveying in which acoustic signals are emitted by a source for recording by receivers.

This disclosure is related generally to the field of marine surveying. Marine surveying can include, for example, seismic surveying, among others. For example, this disclosure may have applications in marine seismic surveying, in which one or more sources are used to generate wave-fields, and receivers (towed and/or ocean bottom) receive energy generated by the sources and affected by the interaction with a subsurface formation. The receivers thereby collect marine seismic survey data, which can be useful in the discovery and/or extraction of hydrocarbons from subsurface formations.

Marine seismic surveys can cover a large area; for example, hundreds or thousands of square kilometers of the seafloor. However, only a portion of the area can be surveyed at a time. A marine seismic survey may be performed with a marine survey vessel towing an array of seismic source elements and one or more streamers, which may limit the subline coverage for a sail line. As used herein, "subline" refers to a line of receiver-source midpoints in the in-line direction for a particular seismic source element and all of the receivers on a particular streamer. As used herein, "receiver-source midpoint" refers to a planar surface coordinate in the xy-plane that is mid-way between the location of a particular seismic source element and the location of a particular receiver where the reflection of a wavefield occurs. The planar surface coordinate can be expressed as (x,y). The x-coordinate can correspond to an in-line position and the y-coordinate can correspond to a cross-line position. As used herein, "inline" refers to the direction of travel of the vessel, and "cross-line" is perpendicular to the direction of travel of the vessel. For the sake of efficiency, illustrations and descriptions herein sublines are drawn assuming that all of the streamers of an array are straight and parallel. However, sublines can be curved when the streamers are curved such as in a spiral sail line. As used herein, "fold" refers to a number of times there are contributions to a subline from any seismic source element and receiver combination. As used herein, "subline coverage" refers to the distance between the outermost two sublines. As a result of the limits on subline coverage, it may take several days to several months to complete a marine seismic survey. How much of the area that can be surveyed at a time can be dependent on a configuration of the array the streamers and seismic source elements. For example, as the marine seismic survey vessel tows the array of the streamers and seismic source elements in a particular configuration, the cross-line steamer spacing and the cross-line source separation can determine the width of a subline coverage surveyed by the configuration of the streamers and seismic source elements. The cross-line subline coverage is generally less than the streamer spread width. As used herein, "streamer spread width" refers to the cross-line distance between the outermost streamers of an array of streamers.

A marine seismic survey can include a single sail line, such as a spiral sail line, or multiple sail lines to survey a survey area. As the cross-line source separation increases, the subline coverage increases for a corresponding sail line. Thus, it can be beneficial to increase the cross-line source separation to increase the subline coverage such that a larger portion of an area can be surveyed at a time and the overall survey completion time may be reduced by using fewer sail lines. As the width of each pass increases, a larger portion of the survey area can be surveyed at a time. Thus, a lesser quantity of sail lines would be needed to complete the marine seismic survey. As a result, the marine seismic survey can be completed in less time.

Increasing the cross-line source separation can improve subsurface sampling. Increasing the cross-line source separation can yield short near offsets for a large portion of the streamers. The quantity of receivers with short near offsets can be increased by increasing the cross-line source separation. As used herein, "offset" refers to the distance between a seismic source element and any receiver on a streamer. In contrast, "near offset" for a particular streamer refers to the distance between a seismic source element and the receiver that is most closely located to the seismic source element. In processing, marine seismic survey data, such as reflection information, from only the receivers with short near offsets may contribute to the generation of the subsurface image. When a seismic source element and a receiver are located closely together, the ray path from the seismic source element to the subsurface and back up to the receiver is generally vertical. In contrast, the ray path through the subsurface is generally at a high angle when the offset is long. The physics of elastic solids is such that the amplitude of a reflected wavefield varies with the offset for reflections off of the same interface, even when the material properties on either side of the interface are the same at each reflection. Reflection information from reflections at near offsets can be used to infer properties and the composition of the subsurface and to examine the reflection amplitudes at other offsets. Reflection information at near offset, such as amplitude, can be used in Amplitude versus Offset (AVO) analysis to infer the composition of the subsurface. In processing of reflection information for shallow geology, only the reflection information corresponding to shorter offsets might be used. Thus, if the near offsets are large such that the streamers are a long distance behind the seismic source elements or some of the streamers are far from the seismic source elements in the cross-line direction then there may not be reflection information that contributes to the shallow seismic image. A seismic three dimensional volume may then contain stripes of poor shallow reflection information at the boundaries between adjacent sail lines. The resolution of a subsurface image at sail line boundaries can be improved by increasing the cross-line source separation.

Short near offsets can aid in the prediction of multiples in the marine seismic survey data by increasing the quantity of receivers with short near offsets relative to some previous approaches. With a wider cross-line source separation, the near offset for streamers near the middle of an array of streamers and the edges of the array of streamers can be short. Predicted multiples can be subtracted from the marine survey seismic data in any manner known to one of ordinary skill in the art. As used herein, "multiples" refers to wavefields that have undergone more than one reflection. For example, a multiple can be a wavefield that reflects off of the seafloor, such as the solid surface 104 illustrated in FIG. 1, then reflects off of the sea surface, such as the water surface 109, then reflects off of the subsurface, such as the first uplifted rock layer 112, and then is received by one of the receivers 122. The high resolution of the reflection information from receivers with short near offsets improves the capability of predicting multiples.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the word "may" is used throughout this application in a permissive sense (having the potential to, being able to), not in a mandatory sense (must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. For example, 226 may reference element "26" in FIG. 2, and a similar element may be referenced as 326 in FIG. 3. Analogous elements within a Figure may be referenced with a hyphen and extra numeral or letter. See, for example, elements 320-1, . . . , 320-14 in FIG. 3. Such analogous elements may be generally referenced without the hyphen and extra numeral or letter. For example, elements 320-1, . . . , 320-14 may be collectively referenced as 320. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 illustrates a front or review (xz-plane 130) view of marine seismic surveying in which acoustic signals are emitted by a seismic source 126, such as a seismic source element, for recording by receivers 122 for processing and analysis in order to help characterize the structures and distributions of features and materials underlying the solid surface of the earth. FIG. 1 shows a domain volume 102 of the earth's surface comprising a solid volume 106 of sediment and rock below the solid surface 104 of the earth that, in turn, underlies a fluid volume 108 of water having a water surface 109 such as in an ocean, an inlet or bay, or a large freshwater lake. The domain volume 102 shown in FIG. 1 represents an example experimental domain for a class of marine seismic surveys. FIG. 1 illustrates a first sediment layer 110, an uplifted rock layer 112, second, underlying rock layer 114, and hydrocarbon-saturated layer 116. One or more elements of the solid volume 106, such as the first sediment layer 110 and the first uplifted rock layer 112, can be an overburden for the hydrocarbon-saturated layer 116. In some instances, the overburden may include salt.

FIG. 1 shows an example of a marine survey vessel 118 equipped to carry out marine seismic surveys. In particular, the marine survey vessel 118 can tow one or more streamers 120 (shown as one streamer for ease of illustration) generally located below the water surface 109. The streamers 120 can be long cables containing power and data-transmission lines (electrical, optical fiber, etc.) to which receivers may be connected. In one type of marine seismic survey, each receiver, such as the receiver 122 represented by the shaded disk in FIG. 1, comprises a one or more of sensors including a motion sensor that detects particle displacement within the water by detecting particle motion variation, such as velocities or accelerations, and/or a hydrophone that detects variations in pressure. In another type of marine seismic survey, each receiver can include one or more hydrophones and two or more motion sensors. The streamers 120 and the marine survey vessel 118 can include sophisticated sensing electronics and data-processing facilities that allow receiver readings to be correlated with absolute positions on the water surface and absolute three-dimensional positions with respect to a three-dimensional coordinate system. In FIG. 1, the receivers along the streamers are shown to lie below the water surface 109, with the receiver positions correlated with overlying surface positions, such as a surface position 124 correlated with the position of receiver 122. The marine survey vessel 118 can also tow one or more seismic source elements 126 that produce acoustic signals as the marine survey vessel 118 and streamers 120 move across the water surface 109. A seismic source element 126 is a single seismic source such as a single air gun. The seismic source elements 126 can be grouped together and be components of one or more seismic source sub-arrays. As used herein, "seismic source sub-array" refers to seismic source elements that can be actuated separately or simultaneously. For example, seismic source elements of a seismic source sub-array can be actuated separately and sequentially but without any overlap in recording time between actuations of the seismic source elements. Alternatively, seismic source elements of a seismic source sub-array can be actuated simultaneously with an overlap in recording time between actuations of the seismic source elements. A seismic source sub-array can be seismic source elements that are coupled to a common tow line. A seismic source sub-array can have a common feed line coupled to the seismic source elements of the seismic source sub-array.

The streamers 120 can be spaced apart from one another (spaced apart from an adjacent streamer) by a cross-line streamer separation. The cross-line direction is in the y-direction (not illustrated in FIG. 1), which is into and out of the page. Adjacent seismic source elements 126 can be spaced apart from one another by a cross-line source separation. The cross-line source separation can be greater than the cross-line streamer separation. The cross-line source separation can be based on the cross-line streamer separation. The cross-line source separation and the cross-line streamer separation are illustrated and discussed further below in association with FIGS. 2-16.

The seismic source elements 126 and/or streamers 120 may also be towed by other independent vessels, or may be otherwise disposed in fluid volume 108. For example, receivers may be located on ocean bottom cables or nodes fixed at or near the solid surface 104, and seismic source elements 126 may also be disposed in a nearly-fixed or fixed configuration. The streamers 120 can be towed by one vessel, such as the marine survey vessel 118, and the seismic source elements 126 can be towed by one or more other independent vessels. For the sake of efficiency, illustrations and descriptions herein show seismic receivers located on streamers, but it should be understood that references to seismic receivers located on a "streamer" or "cable" should be read to refer equally to seismic receivers located on a towed streamer, an ocean bottom receiver cable, and/or an array of nodes.

FIG. 1 shows an expanding, spherical acoustic signal, illustrated as semicircles of increasing radius centered at the seismic source element 126, representing a down-going wavefield 128, following an acoustic signal emitted by the seismic source element 126. The down-going wavefield 128 is, in effect, shown in a vertical plane cross section in FIG. 1. The outward and downward expanding down-going wavefield 128 may eventually reach the solid surface 104, at which point the outward and downward expanding down-going wavefield 128 may partially scatter, may partially reflect back toward the streamers 120, and may partially refract downward into the solid volume 106, becoming elastic acoustic signals within the solid volume 106.

One or more lateral force and depth (LFD) control devices (not shown in FIG. 1) can be components of or coupled to the streamers 120. Each LFD control device can include one or more rotatable control surfaces that when moved to a selected rotary orientation with respect to the direction of movement of such surfaces through the fluid volume 108 creates a hydrodynamic lift in a selected direction to urge the streamer 120 in a direction upward or downward in the fluid volume 108 or laterally along the water surface 109 with respect to the direction of motion of the marine survey vessel 118. Thus, the LFD control devices can be used to maintain the streamers in a particular geometric arrangement. For example, the streamers 120 can be substantially straight and parallel to each other. The LFD control devices can be used to induce a streamer spread angle. As used herein, "streamer spread angle" refers to an angle between a sail line of the marine survey vessel 118 and one of the streamers 120. Inducing a streamer spread angle that is greater than zero degrees can cause the cross-line streamer separation at the front end of the streamers 120 to be less than the cross-line streamer separation at the back, or aft, end of the streamers 120. This gradual increase in the cross-line streamer separation from the front end to the back end of the streamers 120 can "fan out" the streamers 120. Fanning out the streamers can increase fold uniformity at sublines near the edges of each sail line, thereby reducing a likelihood that streamer feathering may cause far ends of the streamers not to contribute to all sublines. Streamer feathering may be caused by prevailing conditions such as currents.

Figure 2:
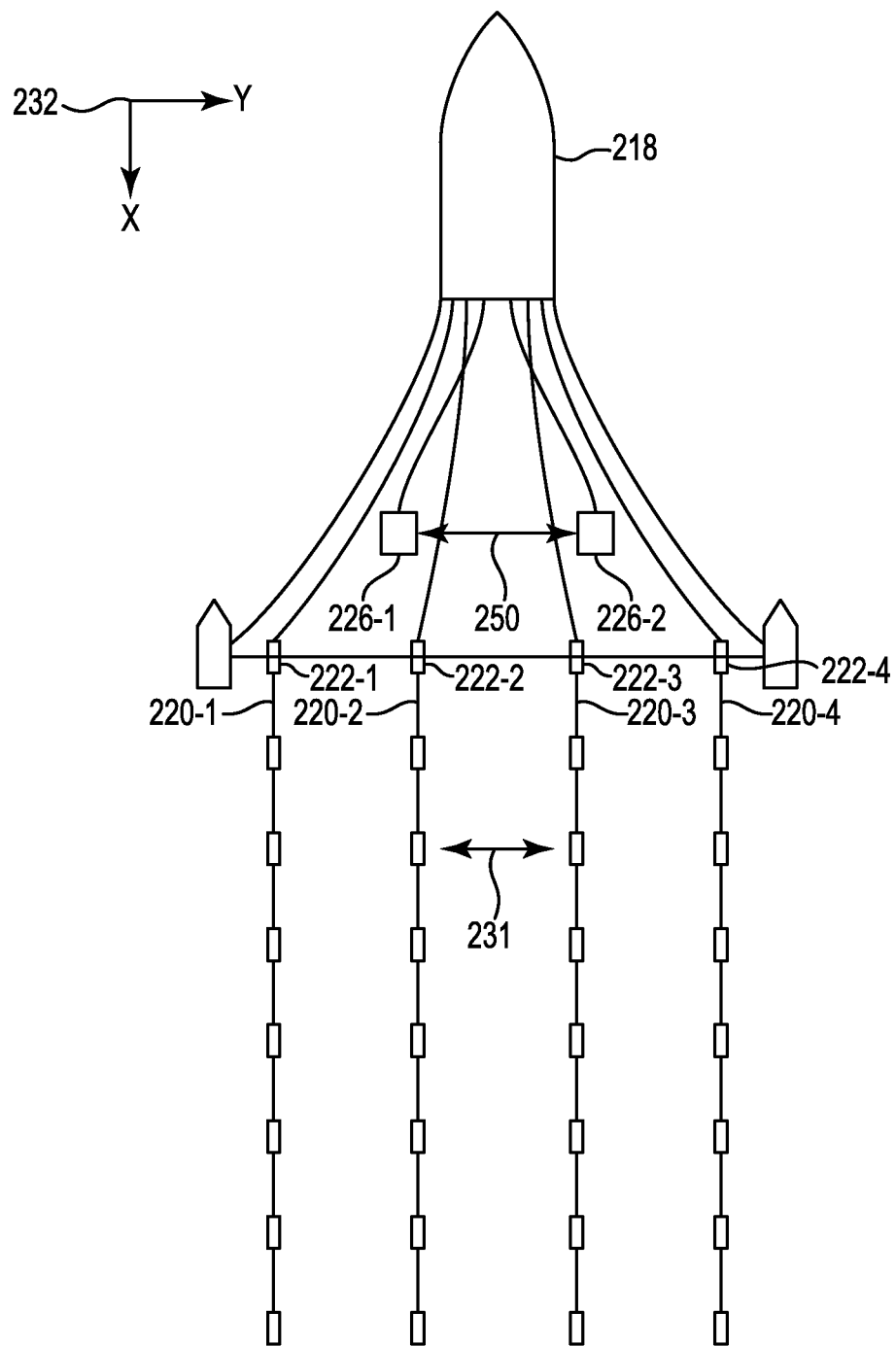
FIG. 2 illustrates a plan (yx-plane) view of marine seismic surveying with two seismic source elements positioned outside the innermost two streamers.

FIG. 2 illustrates a plan (yx-plane 232) view of marine seismic surveying with two seismic source elements 226-1 and 226-2. FIG. 2 shows an example of a marine survey vessel 218, which can be analogous to the marine seismic survey vessel 118 illustrated in FIG. 1, equipped to carry out marine seismic surveys. The marine seismic vessel 218 can tow one or more streamers, such as the streamers 220-1, 220-2, 220-3, and 220-4, which can be analogous to the streamer 120 illustrated in FIG. 1. The streamers 220-1, 220-2, 220-3, and 220-4 can include one or more receivers (represented by the small rectangles), such as the receivers 222-1, 222-2, 222-3, and 222-4, which can be analogous to the receivers 122 illustrated in FIG. 1. The streamers 220-1, 220-2, 220-3, and 220-4 are referred to collectively as the streamers 220, the receivers 222-1, 222-2, 222-3, and 222-4 and the receivers not numbered in FIG. 2 are referred to collectively as the receivers 222, and the seismic source elements 226-1 and 226-2 are referred to collectively as the sources 226. The marine seismic survey vessel can tow one or more seismic source elements, such as the seismic source elements 226-1 and 226-2, which can be analogous to the seismic source elements 126 illustrated in FIG. 1. The recorded data can be three-dimensional in that it includes data from wavefields traveling in both an inline (x) direction and a cross-line (y) direction, plus depth. Although FIG. 2 illustrates two seismic source elements 226-1 and 226-2, four streamers 220, and thirty-two receivers 222, embodiments are not so limited.

The marine survey vessel 218 can include a control system and a recording system, which may be separate systems that communicate data between each other, or they may be sub-systems of an integrated system. The control system can be configured to selectively actuate the seismic source elements 226, while the recording system can be configured to record the signals generated by the receivers 222 in response to the energy imparted into the water and thereby into subterranean material formations below the solid surface. The recording system can be configured to determine and record the geodetic positions of the seismic source elements and the receivers 222 at any time. Seismic source element actuation and signal recording by the receivers 222 may be repeated a plurality of times while the marine survey vessel 218 moves through the water. Each actuation record may include, for each of the receivers 222, signals corresponding to the energy produced by the seismic source elements 226.

The cross-line streamer separation 231 illustrates the spacing of the streamer 220-2 from the streamer 220-3. The cross-line direction is in the y-direction illustrated in FIG. 2. Although only indicated for the streamers 220-2 and 220-3, the streamer 220-1 can be spaced apart from the streamer 220-2 by the cross-line streamer separation 231 and the streamer 220-3 can be spaced apart from the streamer 220-4 by the cross-line streamer separation 231. The cross-line streamer separation 231 can be a nominal cross-line streamer separation. As used herein, a "nominal cross-line streamer separation" refers to the cross-line distance between the front ends of adjacent streamers. The cross-line streamer separation 231 can be an average cross-line streamer separation. When the streamers 220 are irregularly spaced apart from one another, the cross-line separation 231 can be the average of the cross-line separation between each of the streamers 220. For example, the cross-line streamer separation 231 can be the average of the spacing of the streamer 220-1 from the streamer 220-2, the spacing of the streamer 220-2 from the streamer 220-3, and the spacing of the streamer 220-3 from the streamer 220-4. In at least one embodiment, the streamers 220 can be towed in a curved path.

As illustrated in FIG. 2, the seismic source element 226-1 is spaced apart from the seismic source element 226-2 by a cross-line source separation 250. In at least one embodiment, the cross-line source separation 250 can be directly proportional to the cross-line streamer separation 231, which is a distance identified as length (L). In at least one embodiment, the constant of proportionality can be a fraction rather than a whole number as represented by the expression k+1/S. In at least one embodiment, the cross-line source separation 250 can be based on an integer (k), an inverse of the quantity of the seismic source elements 226 (1/S), and the cross-line streamer separation 231 for a particular marine seismic survey. The cross-line source separation 250 can be based on a sum of the integer (k) and the inverse of the quantity of the seismic source elements (1/S) multiplied by the cross-line streamer separation (L) as represented by the expression (k+1/S)L. As an example, when the cross-line source separation 250 is an odd or even multiple of the cross-line streamer separation 231 plus one half of the cross-line streamer separation 231, the cross-line subline separation is one quarter of the cross-line streamer separation 231. In at least one embodiment, the integer (k) can be between one and one less than a quantity of the streamers (N−1), inclusive. As in the example of FIG. 2 where there are four streamers 220, the integer (k) can be 1, 2, or 3. In at least one embodiment, the integer (k) can be between one and half of the quantity of the streamers (N/2), inclusive. As in the example of FIG. 2 where there are four streamers 220, the integer (k) can be 1 or 2. In at least one embodiment, the integer (k) can be between one half of one less than the quantity of the streamers ((N−1)/2), inclusive. As in the example of FIG. 2 where there are four streamers 220, the integer (k) can be 1 or 2. For example, if N is 8 then the range of the integer (k) is bounded by 1 and 7/2 (3.5). The integer (k) can be 1, 2, or 3. In at least one embodiment, the cross-line source separation 250 can be based on an integer (k), a multiple ($\alpha$) of an inverse of the quantity of the seismic source elements 226 ($\alpha$/S), and the cross-line streamer separation 231 for a particular marine seismic survey. Additional examples of various cross-line source separations based on various values of the integer (k), various cross-line streamer separation, and various quantities of seismic source elements are discussed further below in association with FIGS. 3-13A.

Figure 5:
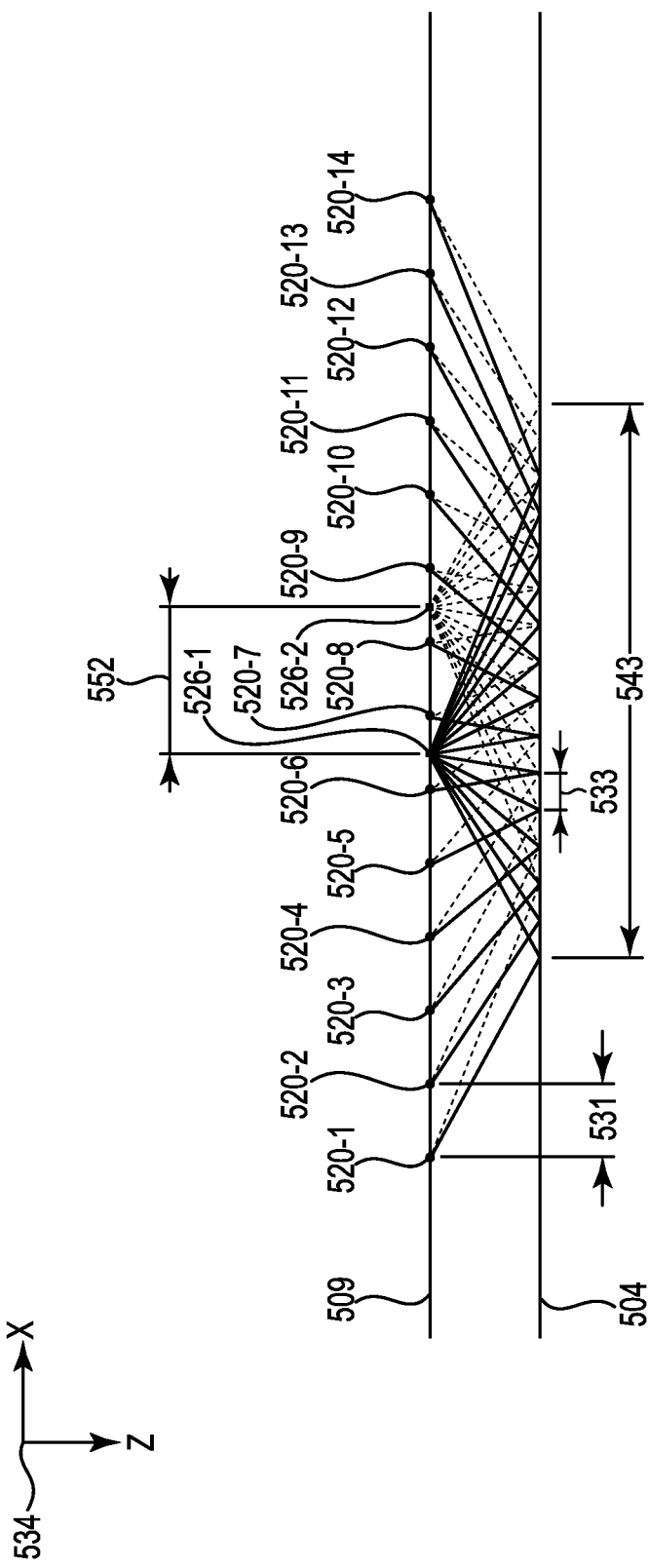
FIG. 5 illustrates a front or rear (yz-plane) view of a configuration of an array of seismic source elements and streamers where two seismic source elements are positioned outside the innermost two streamers.
Figure 8:
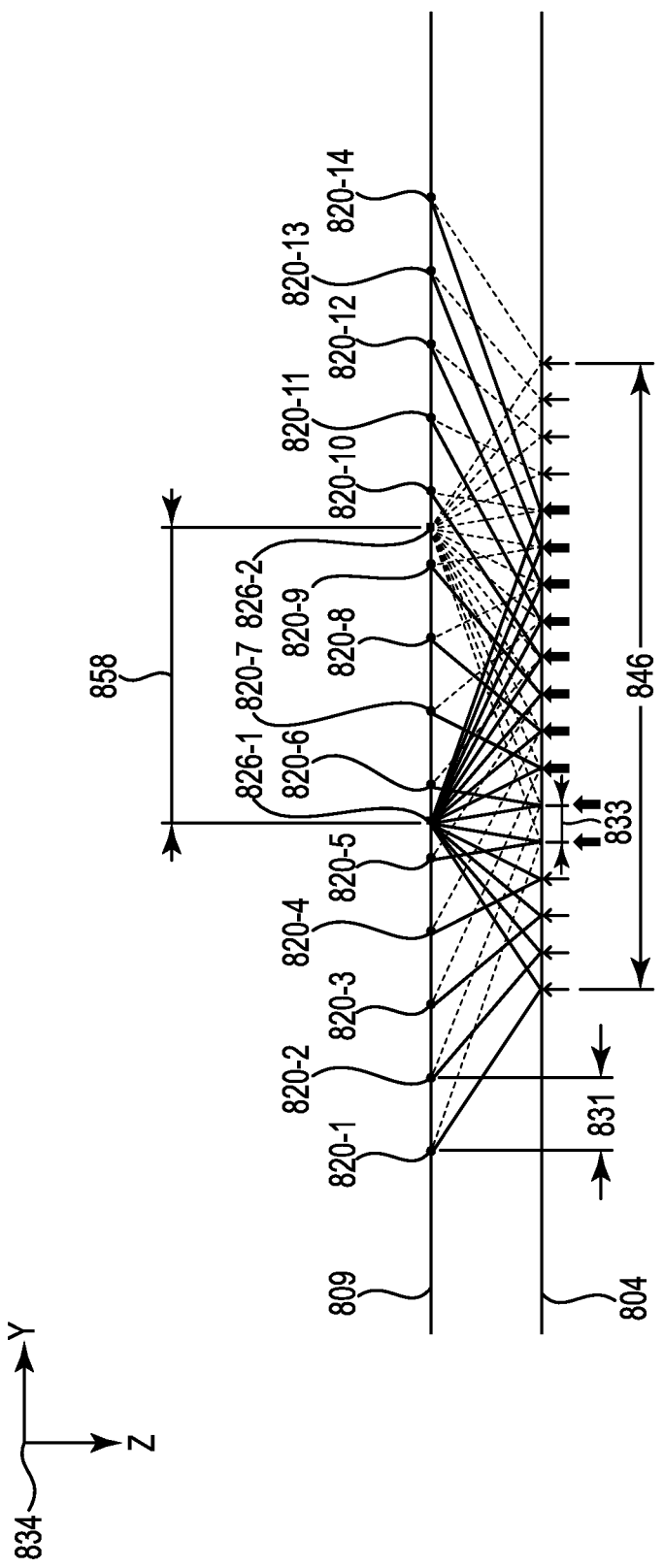
FIG. 8 illustrates a front or rear (yz-plane) view of a configuration of an array of seismic source elements and streamers where two seismic source elements are positioned outside the innermost four streamers.

In at least one embodiment, the cross-line source separation 250 can be based on an even integer ($k_e$) and the cross-line streamer separation (L) 231. The cross-line source separation 250 can be based on the multiplication of the even integer ($k_e$) and the cross-line streamer separation (L) 231 as represented by the expression $k_e L$. The even integer ($k_e$) ensures that the seismic source elements 226 are nominally positioned in between a pair of adjacent streamers as opposed to being positioned in line with a streamer. As used herein, "nominally positioned in between a pair of adjacent streamers" refers to situations where outside factors, such as waves and turbulence caused by one or more vessels, temporarily causes a seismic source element to not be positioned in between a pair of adjacent streamers. In some previous approaches, seismic source elements may be positioned in line with a streamer when the cross-line source separation is based on the multiplication of an odd integer and the cross-line streamer separation. If a seismic source element, such as the seismic source element 226-1, was in line with a streamer, such as the streamer 220-2, then there may be physical interference with the respective connections of the seismic source element 226-1 and the streamer 220-2, signal interference in the form of noise in the marine seismic survey data, or both physical and signal interference. Positioning a seismic source element between a pair of streamers can improve the cross-line spatial resolution relative to that when a seismic source element is positioned in line with a streamer. FIGS. 5 and 8 illustrate examples of configurations of an array of seismic source elements and streamers where the cross-line source separation is based on the multiplication of an even integer ($k_e$) and the cross-line streamer separation (L).

For the sake of efficiency, illustrations and descriptions herein include individual seismic source elements. However, in at least one embodiment the cross-line source separation 250 can be the distance between adjacent seismic source sub-arrays. As used herein, a "seismic source sub-array" refers to a plurality of seismic source elements. For example, a first seismic source sub-array can be positioned where the seismic source element 226-1 is positioned in FIG. 2 and a second seismic source sub-array can be positioned where the seismic source element 226-2. If the seismic source elements of a seismic source sub-array are actuated together then the location of the seismic source sub-array can be grouped together and represented by a single point at the geometric center of the seismic source sub-array. The cross-line source separation 250 would then be the distance between the geometric centers of the first and second seismic source sub-arrays. In contrast, if the seismic source elements of a seismic source sub-array are actuated individually then the cross-line source separation 250 can be the distance between corresponding seismic source elements of the first and second seismic source sub-arrays. The first seismic source sub-array can include the same quantity or a different quantity of seismic source elements as the second seismic source sub-array. The cross-line source separation 250 can be based on a sum of the integer (k) and the inverse of the quantity of the seismic source sub-arrays ($1/S_A$) multiplied by the cross-line streamer separation (L) as represented by the expression $(k+1/S_A)L$.

As discussed above, a benefit increasing the cross-line source separation can be shorter near offsets over a large portion of the streamers. A wider cross-line source separation can yield shorter near offsets to the outer streamers in an array of streamers than for a narrower source separation. For example, in FIG. 2 the near offset for the seismic source element 226-1 and the streamer 220-1 is the distance from the seismic source element 226-1 and the receiver 222-1. The near offset for the seismic source element 226-1 and the streamer 220-2 is the distance from the seismic source element 226-1 and the receiver 222-2. FIG. 2 illustrates the seismic source elements 226 being positioned fore of the streamers 220. However, the seismic source elements 226 can be positioned above the streamers 220 such that the seismic source elements 226 are aft of the front end of the streamers 220. Therefore, the near offset of a streamer may not be the receiver located at the front end of the streamer. The seismic source elements 226 can be positioned above the streamers 220 by using longer lines to the seismic source elements 226 or by having the seismic source elements be towed by another vessel.

With a wider cross-line source separation, the near offset for streamers near the middle of the array of streamers, such as the streamers 220-2 and 220-3, and the near offset for streamers near the edges of the array of streamers, such as the streamers 220-1 and 220-4 can be short. Short near offsets can aid in the prediction of multiples in marine seismic survey data. Predicted multiples can be subtracted from the marine survey seismic data. Subtracting multiples from marine seismic survey data can be performed in any manner known to one of ordinary skill in the art.

Figure 3:
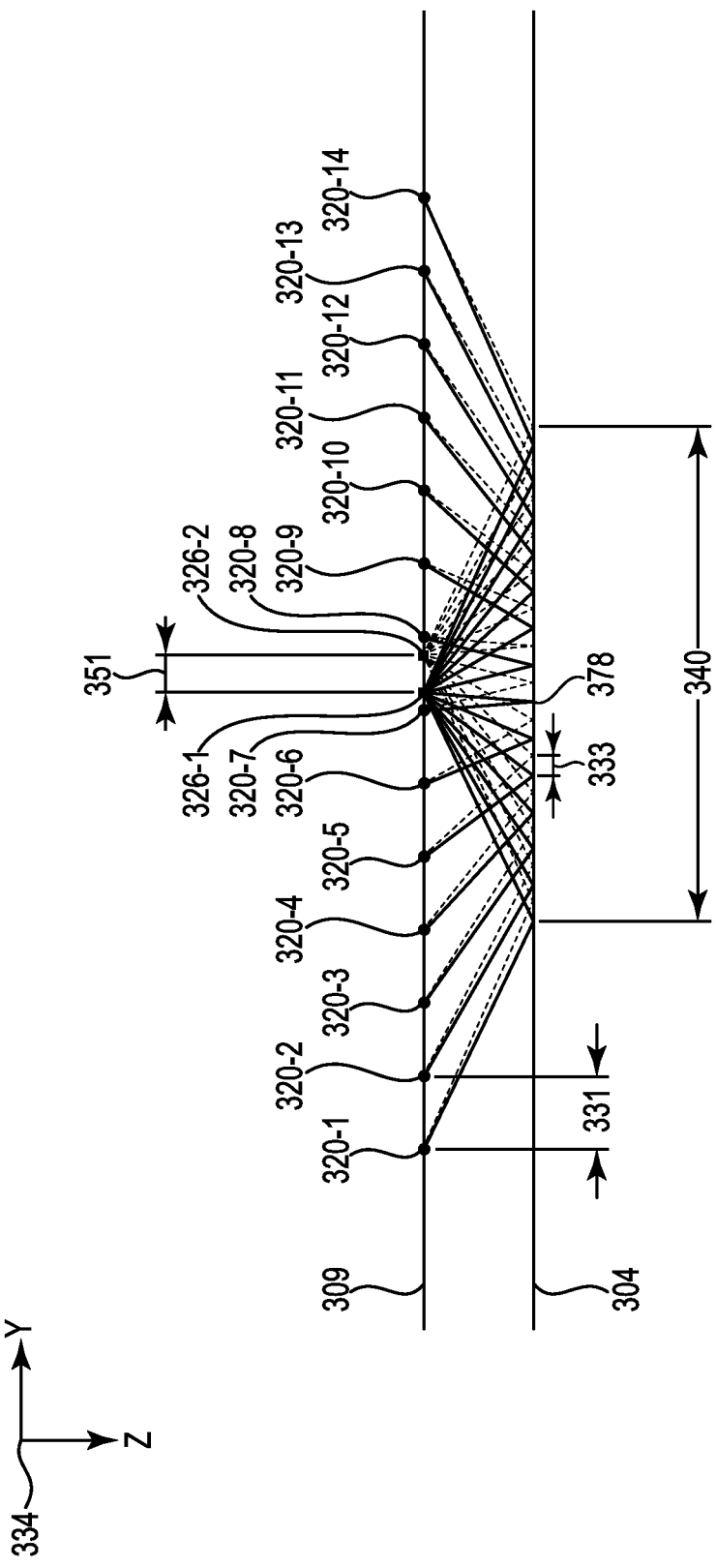
FIG. 3 illustrates a front or rear (yz-plane) view of a previous configuration of an array of seismic source elements and streamers where two seismic source elements are positioned in between the innermost two streamers.

FIG. 3 illustrates a front or rear (yz-plane 334) view of a previous configuration of seismic source elements 326-1 and 326-2 and streamers 320-1, 320-2, 320-3, 320-4, 320-5, 320-6, 320-7, 320-8, 320-9, 320-10, 320-11, 320-12, 320-13, and 320-14 where two seismic source elements 326-1 and 326-2 positioned in between the innermost two streamers 320-7 and 320-8. Each of the circles illustrated in FIGS. 3-9 and 11-13A represents a receiver, such as the receiver 122 illustrated in FIG. 1, on each of the streamers. FIGS. 3-9 and 11-13A show fourteen streamers and two (or three) seismic source elements configured to be towed by a marine survey vessel, such as the marine survey vessel 218 illustrated in FIG. 2.

In FIG. 3, the cross-line source separation 351 between the seismic source elements 326-1 and 326-2 is half of the cross-line streamer separation 331 (L/2). The cross-line direction is in the y-direction illustrated in FIGS. 3-15B. Although the cross-line streamer separation 331 is shown as being between the streamer 320-1 and 320-2, the cross-line streamer separation 331 can be the distance between any two adjacent streamers of the streamers 320 or the average of the distances between adjacent streamers of the streamers 320. This also applies to the cross-line streamer separation illustrated in FIGS. 4-9 and 11-13A. Although in FIGS. 3-9 and 11-13A the streamers and the seismic source elements are illustrated to be on the water surface, the streamers, the seismic source elements, or the streamers and the seismic source elements can be at a depth below the water surface.

In FIGS. 3-9 and 11-13A, ray paths are shown from each of the seismic source elements down to the solid surface at a respective receiver-source midpoint and back up to one of the streamers. For example, the receiver-source midpoint 378 corresponds to the streamer 320-7 and the seismic source element 326-1 illustrated in FIG. 3. A ray path can represent a trajectory of a point on an acoustic wavefront propagating from a seismic source element, to the subsurface and then back up to a receiver. For example, from the seismic source element 326-1 to the solid surface 304 and then back up to the streamer 320-7 illustrated in FIG. 3. The nominal cross-line subline separation is a fraction of the cross-line streamer separation for a particular configuration of an array of seismic source elements and streamers. For example, the nominal cross-line subline separation 333 illustrated in FIG. 3 is one quarter of the cross-line streamer separation 331 (L/4). As used herein, "nominal cross-line subline separation" refers to a distance in the cross-line direction between adjacent sublines that is dependent on the cross-line streamer separation. A smaller nominal cross-line subline separation in the cross-line direction can increase the cross-line resolution of marine seismic survey data and an image generated from the marine seismic survey data. The subline coverage can be the distance between the outermost receiver-source midpoints. For example, the subline coverage 340 shows the length of the subline coverage for the particular configuration illustrated in FIG. 3. As discussed further below in association with FIGS. 13B-15, a receiver-source midpoint has a corresponding full fold subline. Thus, the nominal cross-line subline separation can be analogous to a cross-line subline separation between adjacent full fold sublines.

In the example of FIG. 3, the cross-line streamer separation 331 is 100 meters (m) such that the cross-line source separation 351 is 50 m. The seismic source element 326-1 is positioned 25 m to the right of the streamer 320-7 and the seismic source element 326-2 is positioned 25 m to the left of the streamer 320-8. The nominal cross-line subline separation 333 is 25 m. The subline coverage 340 is 675 m.

Figure 4:
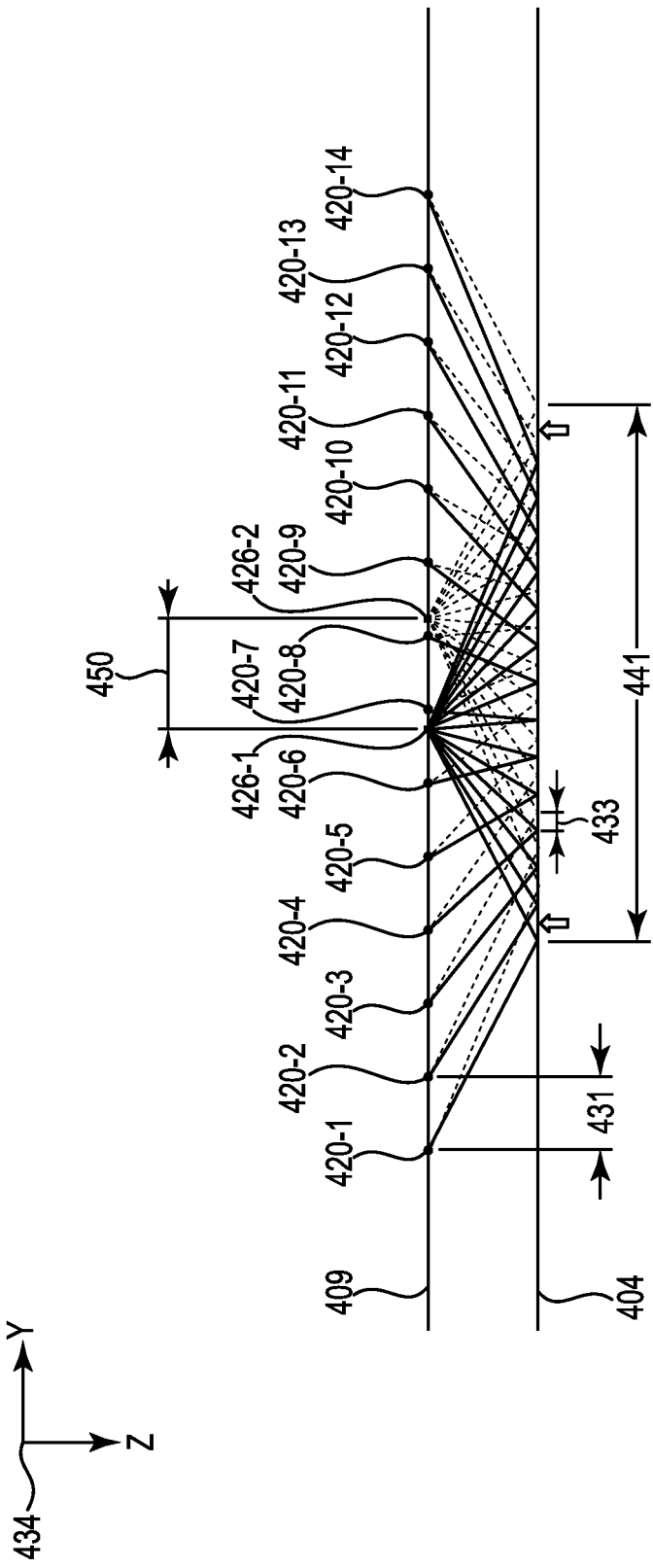
FIG. 4 illustrates a front or rear (yz-plane) view of a configuration of an array of seismic source elements and streamers where two seismic source elements are positioned outside the innermost two streamers.

FIG. 4 illustrates a front or rear (yz-plane 434) view of a configuration of seismic source elements 426-1 and 426-2 and streamers 420-1, 420-2, 420-3, 420-4, 420-5, 420-6, 420-7, 420-8, 420-9, 420-10, 420-11, 420-12, 420-13, and 420-14 where two seismic source elements 426-1 and 426-2 are positioned outside the innermost two streamers 420-7 and 420-8. In contrast to the example of FIG. 3, the cross-line source separation 450 is greater than the cross-line source separation 351 such that the seismic source elements 426-1 and 426-2 are positioned outside the streamers 420-7 and 420-8. The cross-line source separation 450 can be analogous to the cross-line source separation 250 illustrated in FIG. 2. In FIG. 4, the cross-line source separation 450 is based on the cross-line streamer separation 431 (L).

The cross-line source separation 450 is based on the sum of the integer (k) and the inverse of the quantity of the seismic source elements (1/S) multiplied by the cross-line streamer separation 431 (L) as represented by the expression (k+1/S)L. As in the example of FIG. 3, the cross-line streamer separation 431 is 100 m. In the example of FIG. 4, the integer (k) is one and there are two seismic source elements 426. Thus, the cross-line source separation 450 is (1+½)*100 m, or 150 m. The seismic source element 426-1 is positioned 25 m to the left of the streamer 420-7 and the seismic source element 426-2 is positioned 25 m to the right of the streamer 420-8.

Even though the cross-line source separation 450 is wider than the cross-line source separation 351, the nominal cross-line subline separation 433 is still one quarter of the cross-line streamer separation 431 (L/4), or 25 m, as in the example of FIG. 3, without having to increase the quantity of streamers (N) or decrease the cross-line streamer separation (L) 431. The subline coverage 441 is 725 m, 50 m greater than the subline coverage 340 in the example of FIG. 3. However, the subline coverage 441 includes two zero fold sublines as indicated by the open vertical arrows.

Sublines and their corresponding coordinates can be described using a uniform rectangular grid regardless of the geometry of the streamers. For example, if prevailing conditions causes the geometry of the streamers to be curved, the sublines are still described using the same uniform rectangular grid. Sublines can be spaced apart from one another by the nominal cross-line subline separation. However, for some cross-line source separations, such as the cross-line source separation 450, there may be an irregularity in the cross-line subline separations within a particular subline coverage, such as the subline coverage 441. The irregularity in the cross-line subline separations can be a cross-line subline separation different than the nominal cross-line subline separation for certain outer portions of the subline coverage. The irregularity in the cross-line subline separations can be represented by a "zero fold subline," which refers to a location where a finite fold subline (non-zero fold subline) would be if the nominal cross-line subline separation continued but for the irregularity in the cross-line subline separations. A zero fold subline can correspond to a reduction marine seismic survey data or contributions to a subsurface image. Zero fold sublines are discussed further below in association with FIGS. 13-15.

FIG. 5 illustrates a front or rear (yz-plane 534) view of a configuration of seismic source elements 526-1 and 526-2 and streamers 520-1, 520-2, 520-3, 520-4, 520-5, 520-6, 520-7, 520-8, 520-9, 520-10, 520-11, 520-12, 520-13, and 520-14 where two seismic source elements 526-1 and 526-2 are outside the innermost two streamers 520-7 and 520-8. In contrast to the example of FIG. 3, the cross-line source separation 552 is wider than the cross-line source separation 351 such that the seismic source elements 526-1 and 526-2 are positioned outside the streamers 520-7 and 520-8. The cross-line source separation 552 can be analogous to the cross-line source separation 250 illustrated in FIG. 2. In FIG. 5, the cross-line source separation 552 is based on the cross-line streamer separation 531 (L).

The cross-line source separation 552 is based on the even integer ($k_e$) multiplied by the cross-line streamer separation 531 (L) as represented by the expression $k_e$L. As in the example of FIG. 4, the cross-line streamer separation 531 is 100 m. However, in contrast to the example of FIG. 4, in the example of FIG. 5 the even integer ($k_e$) is two. Thus, the cross-line source separation 552 is 2*100 m, or 200 m. The seismic source element 526-1 is positioned 50 m to the left of the streamer 520-7 and the seismic source element 526-2 is positioned 50 m to the right of the streamer 520-8. The nominal cross-line subline separation 533 is half of the cross-line streamer separation 531 (L/2), or 50 m. The subline coverage 543 is 750 m, 25 m greater than the subline coverage 441 in the example of FIG. 4. The subline coverage 543 does not include zero fold sublines but does include double fold sublines as indicated by the thick vertical arrows. Double fold sublines correspond to two coincidental, or nearly coincidental, receiver-source midpoints.

Figure 6:
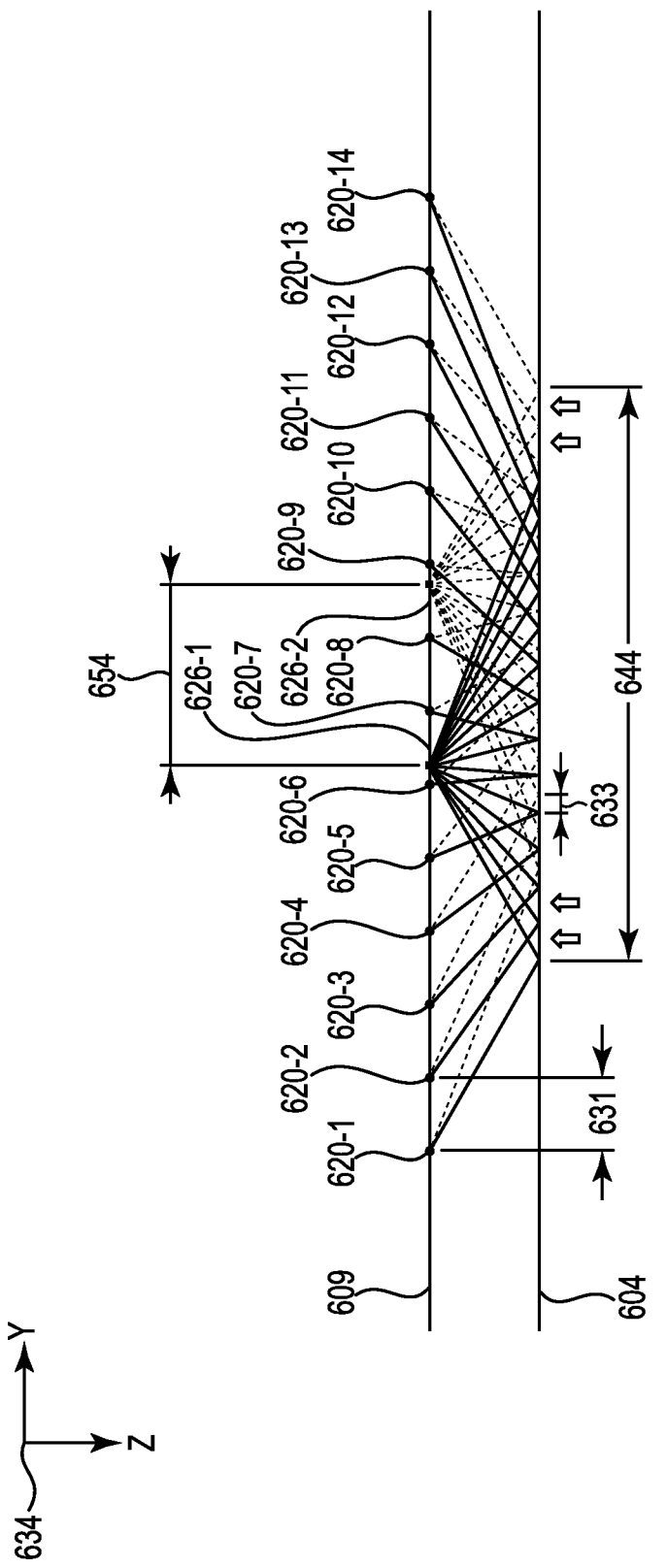
FIG. 6 illustrates a front or rear (yz-plane) view of a configuration of an array of seismic source elements and streamers where two seismic source elements are positioned outside the innermost two streamers.

FIG. 6 illustrates a front or rear (yz-plane 634) view of a configuration of seismic source elements 626-1 and 626-2 and streamers 620-1, 620-2, 620-3, 620-4, 620-5, 620-6, 620-7, 620-8, 620-9, 620-10, 620-11, 620-12, 620-13, and 620-14 where two seismic source elements 626-1 and 626-2 are positioned outside the innermost two streamers 620-7 and 620-8. In contrast to the example of FIG. 3, the cross-line source separation 654 is wider than the cross-line source separation 351 such that the seismic source elements 626-1 and 626-2 are positioned outside the streamers 620-7 and 620-8. The cross-line source separation 654 can be analogous to the cross-line source separation 250 illustrated in FIG. 2. In FIG. 6, the cross-line source separation 654 is based on the cross-line streamer separation 631 (L).

The cross-line source separation 654 is based on the sum of the integer (k) and the inverse of the quantity of the seismic source elements (1/S) multiplied by the cross-line streamer separation 631 (L) as represented by the expression (k+1/S)L. As in the example of FIG. 4, the cross-line streamer separation 631 is 100 m and there are two seismic source elements 626. However, in the example of FIG. 6, the integer (k) is two. Thus, the cross-line source separation 654 is (2+½)*100 m, or 250 m. The seismic source element 626-1 is positioned 75 m to the left of the streamer 620-7 and the seismic source element 626-2 is positioned 75 m to the right of the streamer 620-8.

Even though the cross-line source separation 654 is wider than the cross-line source separation 351 of the example of FIG. 3 and even wider than the cross-line source separation 450 of the example of FIG. 4, the nominal cross-line subline separation 633 is still one quarter of the cross-line streamer separation 631 (L/4), or 25 m. The nominal cross-line subline separation 633 remains one quarter of the cross-line streamer separation 631 (L/4) without having to increase the quantity of streamers (N) or decrease the cross-line streamer separation (L) 631. Increasing the integer (k) from one as in the example of FIG. 4 to two increases the subline coverage 644 from 725 to 775 m. However, the subline coverage 644 includes four zero fold sublines as indicated by the open vertical arrows.

Figure 7:
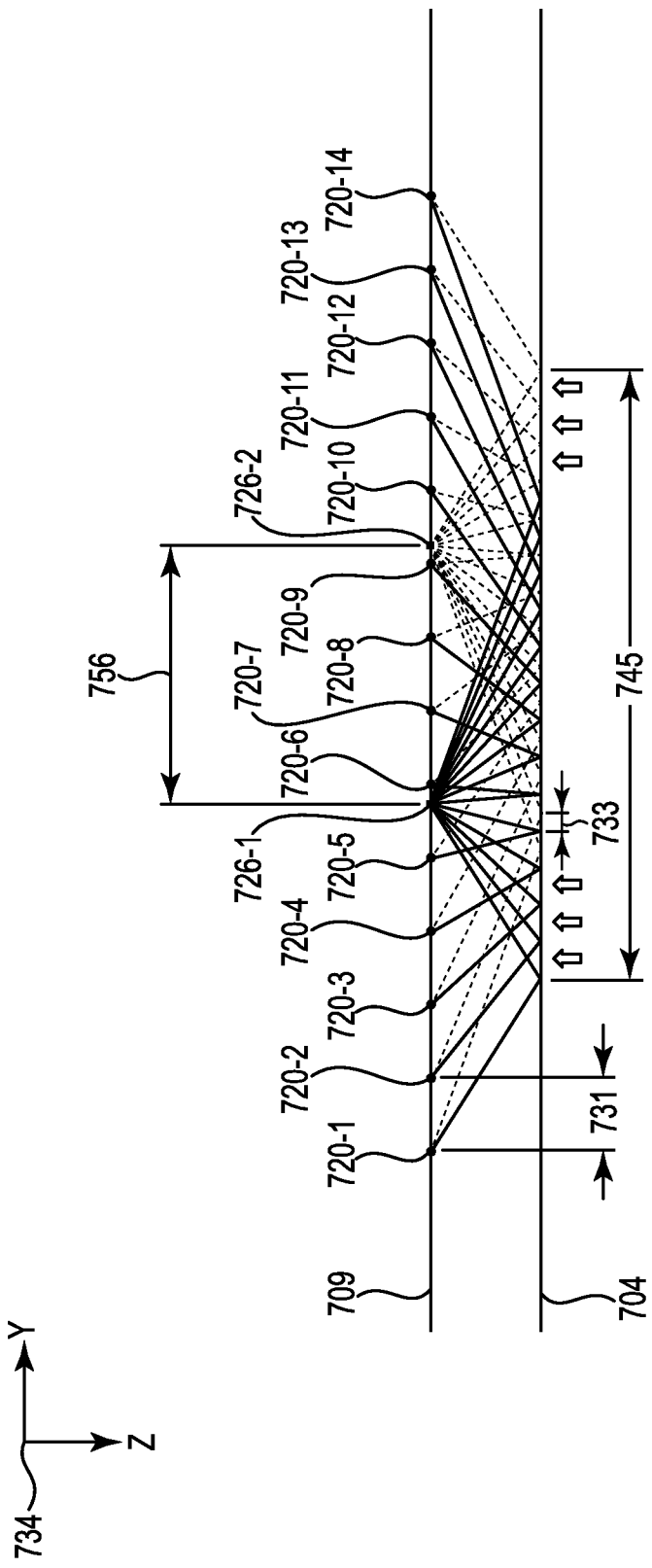
FIG. 7 illustrates a front or rear (yz-plane) view of an array of seismic source elements and streamers where two seismic source elements are positioned outside the innermost four streamers.

FIG. 7 illustrates a front or rear (yz-plane 734) view of a configuration of seismic source elements 726-1 and 726-2 and streamers 720-1, 720-2, 720-3, 720-4, 720-5, 720-6, 720-7, 720-8, 720-9, 720-10, 720-11, 720-12, 720-13, and 720-14 where two seismic source elements 726-1 and 726-2 are positioned outside the innermost four streamers 720-6, 720-7, 720-8, and 720-9. In contrast to the example of FIG. 3, the cross-line source separation 756 is wider than the cross-line source separation 351 such that the seismic source elements 726-1 and 726-2 are positioned outside the streamers 720-7 and 720-8 and outside the streamers 720-6 and 720-9. The cross-line source separation 756 can be analogous to the cross-line source separation 250 illustrated in FIG. 2. In FIG. 7, the cross-line source separation 756 is based on the cross-line streamer separation 731 (L).

The cross-line source separation 756 is based on the sum of the integer (k) and the inverse of the quantity of the seismic source elements (1/S) multiplied by the cross-line streamer separation 731 (L) as represented by the expression (k+1/S)L. As in the example of FIG. 4, the cross-line streamer separation 731 is 100 m and there are two seismic source elements 726. However, in the example of FIG. 7, the integer (k) is three. Thus, the cross-line source separation 756 is (3+½)*100 m, or 350 m. The seismic source element 726-1 is positioned 25 m to the left of the streamer 720-6 (125 m to the left of the streamer 720-7) and the seismic source element 726-2 is positioned 25 m to the right of the streamer 720-9 (125 m to the right of the streamer 720-8).

Even though the cross-line source separation 756 is wider than the cross-line source separation 351 of the example of FIG. 3 and even wider than the cross-line source separation 450 of the example of FIG. 4, the nominal cross-line subline separation 733 is still one quarter of the cross-line streamer separation 731 (L/4), or 25 m. The nominal cross-line subline separation remains one quarter of the cross-line streamer separation 731 (L/4) without having to increase the quantity of streamers (N) or decrease the cross-line streamer separation (L) 731. Increasing the integer (k) from one as in the example of FIG. 4 to three increases the subline coverage 745 from 725 to 825 m. However, the subline coverage 745 includes six zero fold sublines as indicated by the open vertical arrows.

FIG. 8 illustrates a front or rear (yz-plane 834) view of a configuration of seismic source elements 826-1 and 826-2 and streamers 820-1, 820-2, 820-3, 820-4, 820-5, 820-6, 820-7, 820-8, 820-9, 820-10, 820-11, 820-12, 820-13, and 820-14 where two seismic source elements 826-1 and 826-2 positioned outside the innermost four streamers 820-6, 820-7, 820-8, and 820-9. In contrast to the example of FIG. 3, the cross-line source separation 858 is wider than the cross-line source separation 351 such that the seismic source elements 826-1 and 826-2 are positioned outside the streamers 820-7 and 820-8 and outside the streamers 820-6 and 820-9. The cross-line source separation 858 can be analogous to the cross-line source separation 250 illustrated in FIG. 2. In FIG. 8, the cross-line source separation 858 is based on the cross-line streamer separation 831 (L).

The cross-line source separation 856 is based on the even integer ($k_e$) multiplied by the cross-line streamer separation 831 (L) as represented by the expression $k_eL$. As in the example of FIG. 4, the cross-line streamer separation 831 is 100 m. However, in contrast to the example of FIG. 4, in the example of FIG. 8 the even integer ($k_e$) is four. Thus, the cross-line source separation 856 is 4*100 m, or 400 m. The seismic source element 826-1 is positioned 50 m to the left of the streamer 820-6 (150 m to the left of the streamer 820-7) and the seismic source element 826-2 is positioned 50 m to the right of the streamer 820-9 (150 m to the right of the streamer 820-8). The nominal cross-line subline separation 833 is half of the cross-line streamer separation 831 (L/2), or 50 m. The subline coverage 846 is 850 m, 125 m greater than the subline coverage 441 in the example of FIG. 4. The subline coverage 846 does not include zero fold sublines but does include double fold sublines as indicated by the thick vertical arrows. Double fold sublines correspond to two coincidental, or nearly coincidental, receiver-source midpoints.

Figure 9:
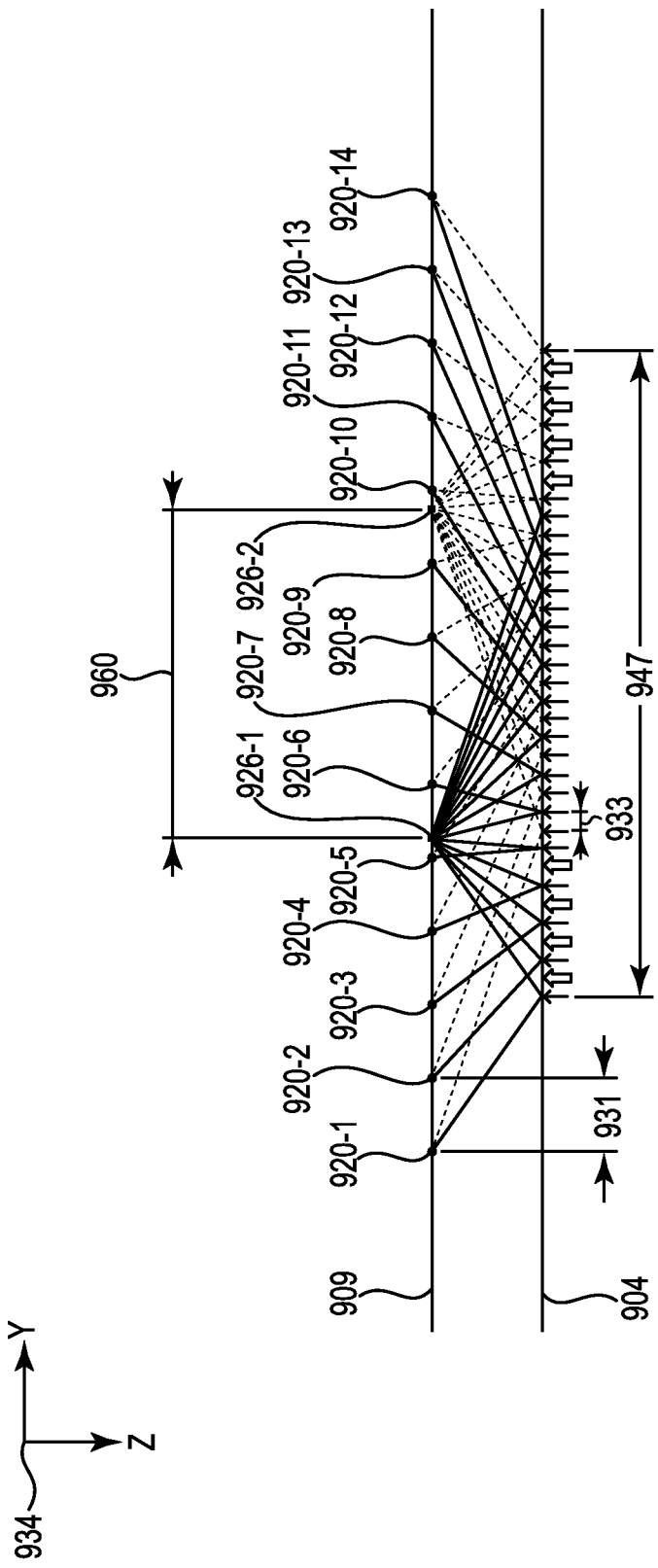
FIG. 9 illustrates a front or rear (yz-plane) view of a configuration of an array of seismic source elements and streamers where two seismic source elements are positioned outside the innermost four streamers.

FIG. 9 illustrates a front or rear (yz-plane 934) view of a configuration of seismic source elements 926-1 and 926-2 and streamers 920-1, 920-2, 920-3, 920-4, 920-5, 920-6, 920-7, 920-8, 920-9, 920-10, 920-11, 920-12, 920-13, and 920-14 where two seismic source elements 926-1 and 926-2 positioned outside the innermost four streamers 920-6, 920-7, 920-8, and 920-9. In contrast to the example of FIG. 3, the cross-line source separation 960 is wider than the cross-line source separation 351 such that the seismic source elements 926-1 and 926-2 are positioned outside the streamers 920-7 and 920-8 and outside the streamers 920-6 and 920-9. The cross-line source separation 960 can be analogous to the cross-line source separation 250 illustrated in FIG. 2.

In FIG. 9, the cross-line source separation 960 is based on the cross-line streamer separation 931 (L). The cross-line source separation 960 is based on the sum of the integer (k) and the inverse of the quantity of the seismic source elements (1/S) multiplied by the cross-line streamer separation 931 (L) as represented by the expression (k+1/S)L. As in the example of FIG. 4, the cross-line streamer separation 931 is 100 m and there are two seismic source elements 926. However, in the example of FIG. 9, the integer (k) is four. Thus, the cross-line source separation 960 is (4+½)*100 m, or 450 m. The seismic source element 926-1 is positioned 75 m to the left of the streamer 920-6 (175 m to the left of the streamer 920-7) and the seismic source element 926-2 is positioned 75 m to the right of the streamer 920-9 (175 m to the right of the streamer 920-8).

Even though the cross-line source separation 956 is wider than the cross-line source separation 351 in the example of FIG. 3 and even wider than the cross-line source separation 450 in the example of FIG. 4, the nominal cross-line subline separation 933 is still one quarter of the cross-line streamer separation 931 (L/4), or 25 m, without having to increase the quantity of streamers (N) or decrease the cross-line streamer separation (L) 931. Increasing the integer (k) from one as in the example of FIG. 4 to four increases the subline coverage 947 from 725 to 875 m. However, the subline coverage 947 includes eight zero fold sublines as indicated by the open vertical arrows. The nominal cross-line subline separation 833 of the example of FIG. 8 is L/2. In contrast, the nominal cross-line subline separation 933 is L/4. In FIG. 8, there is a full fold subline (indicated by the thin vertical arrows) or a double fold subline (indicated by the thick vertical arrows) every L/2 of the subline coverage 846. However, in FIG. 9 is a full fold subline (indicated by the thin vertical arrows) every L/4 only in the middle of the subline coverage 947, but at the ends of the subline coverage 947 there is a full fold subline every L/2. Full fold sublines correspond to a single receiver-source midpoint.

Figure 10:
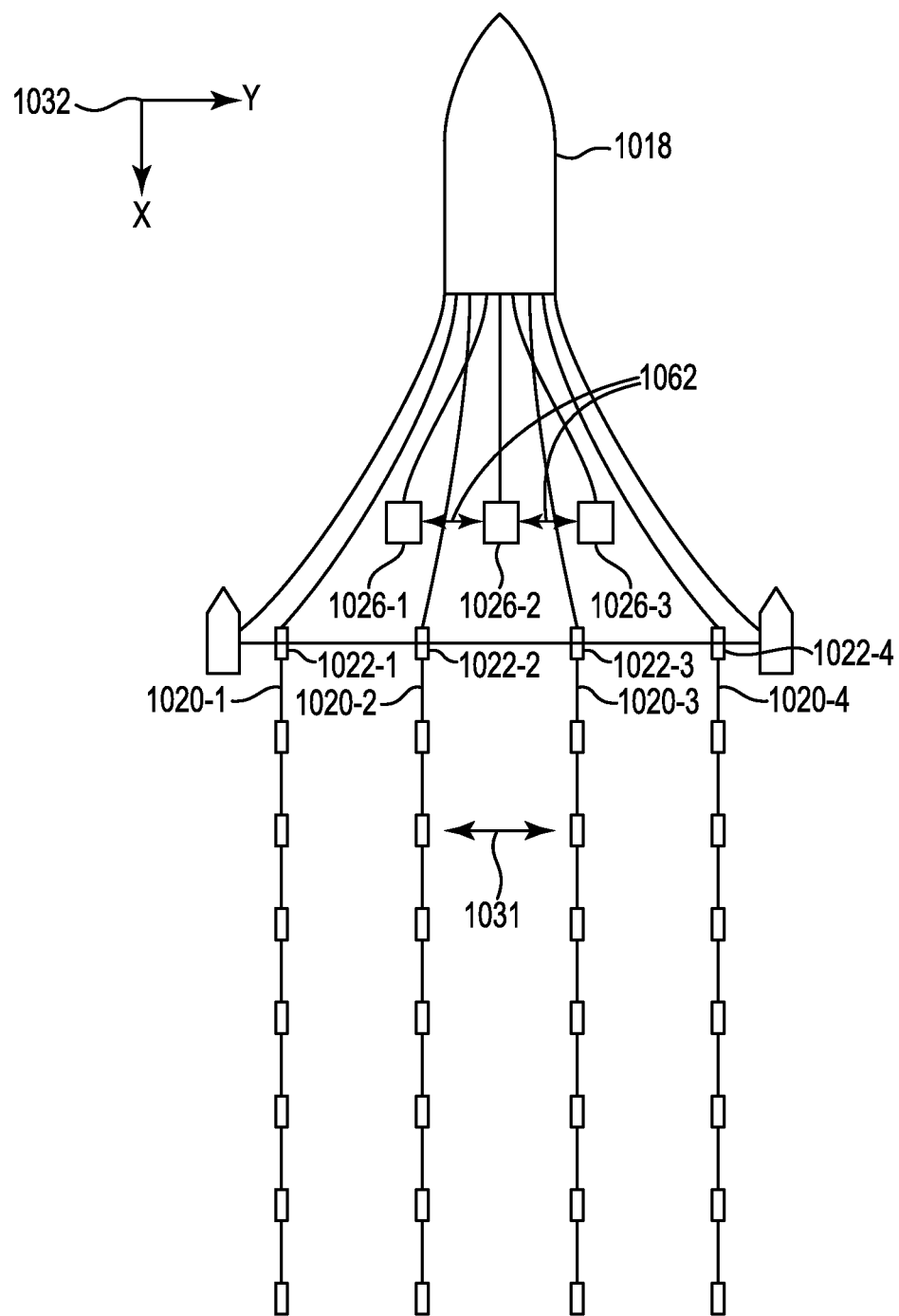
FIG. 10 illustrates a plan (yx-plane) view of marine seismic surveying with two of three seismic source elements positioned outside the innermost two streamers.

FIG. 10 illustrates a plan (yx-plane 1032) view of marine seismic surveying with three seismic source elements 1026-1, 1026-2, and 1026-3. FIG. 10 is analogous to FIG. 2 except that there are three seismic source elements 1026-1, 1026-2, and 1026-3. The marine seismic survey vessel 1018 can tow one or more seismic source elements, such as the seismic source elements 1026-1, 1026-2, and 1026-3, which can be analogous to the seismic source elements 126 illustrated in FIG. 1. The seismic source elements 1026-1, 1026-2, and 1026-3 are referred to collectively as the seismic source elements 1026.

The cross-line streamer separation 1031 illustrates the spacing of the streamer 1020-2 from the streamer 1020-3. Although only indicated for the streamers 1020-2 and 1020-3, the streamer 1020-1 can be spaced apart from the streamer 1020-2 by the cross-line streamer separation 1031 and the streamer 1020-3 can be spaced apart from the streamer 1020-4 by the cross-line streamer separation 1031. The cross-line streamer separation 1031 can be a nominal cross-line streamer separation. The cross-line streamer separation 1031 can be an average cross-line streamer separation. When the streamers 1020 are irregularly spaced apart from one another, the cross-line separation 1031 can be the average of the cross-line separation between each of the streamers 1020. For example, the cross-line streamer separation 1031 can be the average of the spacing of the streamer 1020-1 from the streamer 1020-2, the spacing of the streamer 1020-2 from the streamer 1020-3, and the spacing of the streamer 1020-3 from the streamer 1020-4. In at least one embodiment, the streamers 1020 can be towed in a curved path.

As illustrated in FIG. 10, the seismic source element 1026-1 is spaced apart from the seismic source element 1026-2 by a cross-line source separation 1062 and the seismic source element 1026-2 is spaced apart from the seismic source element 1026-3 by the cross-line source separation 1062. In at least one embodiment, the cross-line source separation 1062 can be directly proportional to the cross-line streamer separation 1031 (L). In at least one embodiment, the cross-line source separation 1062 can be based on an integer (k), an inverse of the quantity of the seismic source elements 1026 (1/S), and the cross-line streamer separation 1031 for a particular marine survey. The cross-line source separation 1062 can be based on a sum of the integer (k) and the inverse of the quantity of the seismic source elements (1/S) multiplied by the cross-line streamer separation (L) as represented by the expression (k+1/S)L. The integer (k) can be between one and one less than a quantity of the streamers (N−1), inclusive. As in the example of FIG. 10 where there are four streamers 1020, the integer (k) can be 1, 2, or 3.

In at least one embodiment, the integer (k) can be between one and half of the quantity of the streamers (N/2), inclusive. As in the example of FIG. 10 where there are four streamers 1020, the integer (k) can be 1 or 2. In at least one embodiment, the integer (k) can be between one and half of one less than the quantity of the streamers ((N−1)/2), inclusive. As in the example of FIG. 10 where there are four streamers 1020 (N=4), then the range of the integer (k) is bounded by 1 and 3/2 (1.5). Thus, the integer (k) can be 1.

Although not illustrated in FIG. 10, in at least one embodiment the cross-line source separation 1062 can be the distance between adjacent seismic source sub-arrays. A first seismic source sub-array, including a plurality of seismic source elements, can be positioned where the seismic source element 1026-1 is positioned in FIG. 10. Similarly, a second seismic source sub-array, including a different plurality of seismic source elements, can be positioned where the seismic source element 1026-2 is positioned in FIG. 10 and a third seismic source sub-array, including yet another different plurality of seismic source elements, can be positioned where the seismic source element 1026-3 is positioned in FIG. 10. If the seismic source elements of a seismic source sub-array are actuated together then the location of the seismic source sub-array can be grouped together and represented by a single point at the geometric center of the seismic source sub-array. The cross-line source separation 1062 would then be the distance between the geometric centers of the first and second seismic source sub-arrays and the distance between the geometric centers of the second and third seismic source sub-arrays. In contrast, if the seismic source elements of a seismic source sub-array are actuated individually then the cross-line source separation 1062 can be the distance between corresponding seismic source elements of the first and second seismic source sub-arrays. The first seismic source sub-array can include the same quantity or a different quantity of seismic source elements as the second or third seismic source sub-arrays. The second seismic source sub-array can include the same quantity or a different quantity of seismic source elements as the first or third seismic source sub-arrays. The cross-line source separation 1062 can be based on a sum of the integer (k) and the inverse of the quantity of the seismic source sub-arrays $(1/S_A)$ multiplied by the cross-line streamer separation (L) as represented by the expression $(k+1/S_A)L$.

As discussed above, a benefit increasing the cross-line source separation can be shorter near offsets over a large portion of the streamers. A wider cross-line source separation can yield shorter near offsets to the outer streamers in an array of streamers than for a narrower source separation. For example, in FIG. 10 the near offset for the seismic source element 1026-1 and the streamer 1020-1 is the distance from the seismic source element 1026-1 and the receiver 1022-1. The near offset for the seismic source element 1026-1 and the streamer 1020-2 is the distance from the seismic source element 1026-1 and the receiver 1022-2. FIG. 10 illustrates the seismic source elements 1026 being positioned forward of the streamers 1020. However, the seismic source elements 1026 can be positioned above the streamers 1020 such that the seismic source elements 1026 are aft of the front end of the streamers 1020. Therefore, the near offset of a streamer may not be the receiver located at the front end of the streamer. The seismic source elements 1026 can be positioned above the streamers 1020 by using longer lines to the seismic source elements 1026 or by having the seismic source elements be towed by another vessel.

With a wider cross-line source separation, the near offset for streamers near the middle of the array of streamers, such as the streamers 1020-2 and 1020-3, and the near offset for streamers near the edges of the array of streamers, such as the streamers 1020-1 and 1020-4 can be relatively short (as compared to the near offset distance if the if the cross-line source separation was smaller). Short near offsets can aid in the prediction of multiples in marine seismic survey data. Predicted multiples can be subtracted from the marine survey seismic data. Subtracting multiples from marine seismic survey data can be performed in any manner known to one of ordinary skill in the art.

Figure 11:
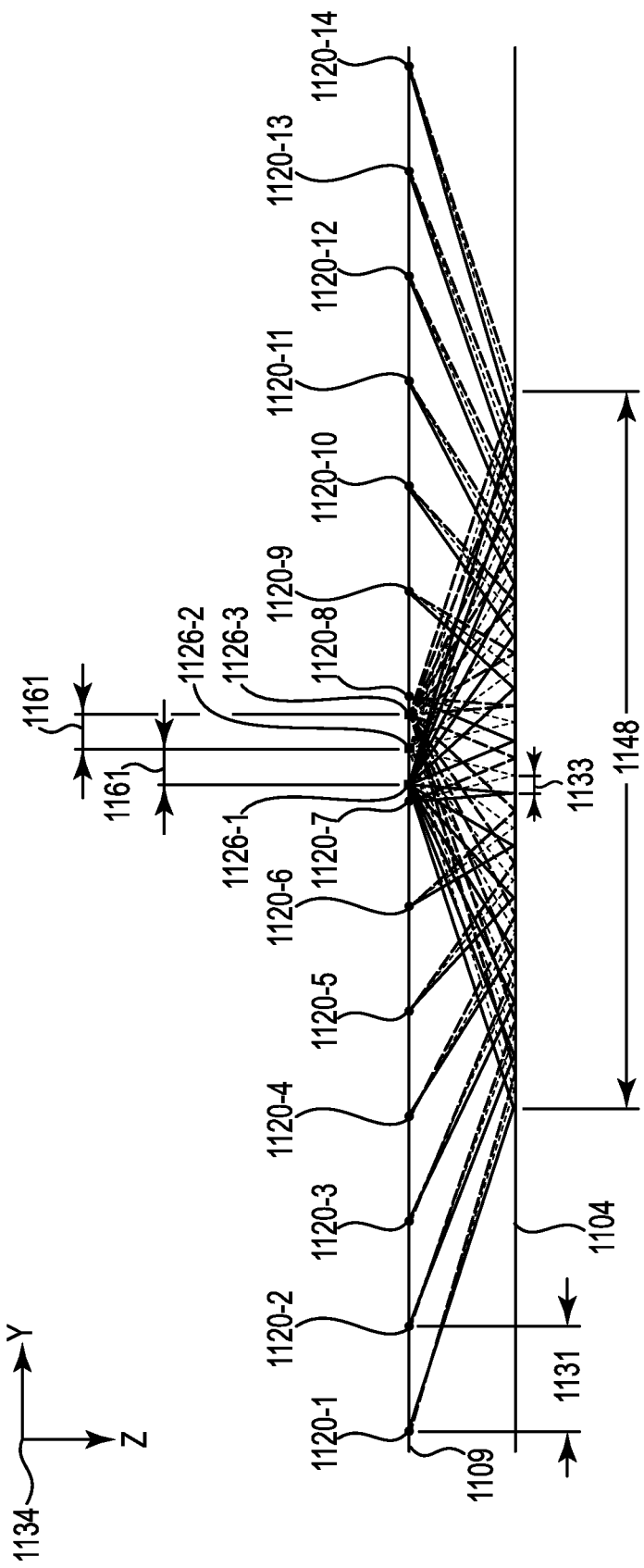
FIG. 11 illustrates a front or rear (yz-plane) view of a previous configuration of an array of seismic source elements and streamers where three seismic source elements are positioned in between the innermost two streamers.

FIG. 11 illustrates a front or rear (yz-plane 1134) view of a previous configuration of seismic source elements 1126-1, 1126-2, and 1126-3 and streamers 1120-1, 1120-2, 1120-3, 1120-4, 1120-5, 1120-6, 1120-7, 1120-8, 1120-9, 1120-10, 1120-11, 1120-12, 1120-13, and 1120-14 where three seismic source elements 1126-1, 1126-2, and 1126-3 are positioned in between the innermost two streamers 1120-7 and 1120-8. In some previous approaches to marine seismic surveying, seismic source elements may be positioned in between the innermost two streamers as illustrated in FIG. 11. In FIG. 11, the cross-line source separation 1161 between the seismic source elements 1126-1 and 1126-2 and the seismic source elements 1126-2 and 1126-3 is one third of the cross-line streamer separation 1131 (L/3). The nominal cross-line subline separation 1133 is one sixth of the cross-line streamer separation 1131 (L/6). The subline coverage 1148 shows the length of the subline for this configuration.

In the example of FIG. 11, the cross-line streamer separation 1131 is 150 m such that the cross-line source separation 1161 is 50 m. The seismic source element 1126-1 is positioned 25 m to the right of the streamer 1120-7, the seismic source element 1126-2 is positioned 75 m to the right of the seismic source element 1126-1 (midway between the streamers 1120-7 and 1120-8), and the seismic source element 1126-3 is positioned 25 m to the left of the streamer 1120-8. The nominal cross-line subline separation 1133 is 25 m. The subline coverage 1148 is 1,025 m.

Figure 12:
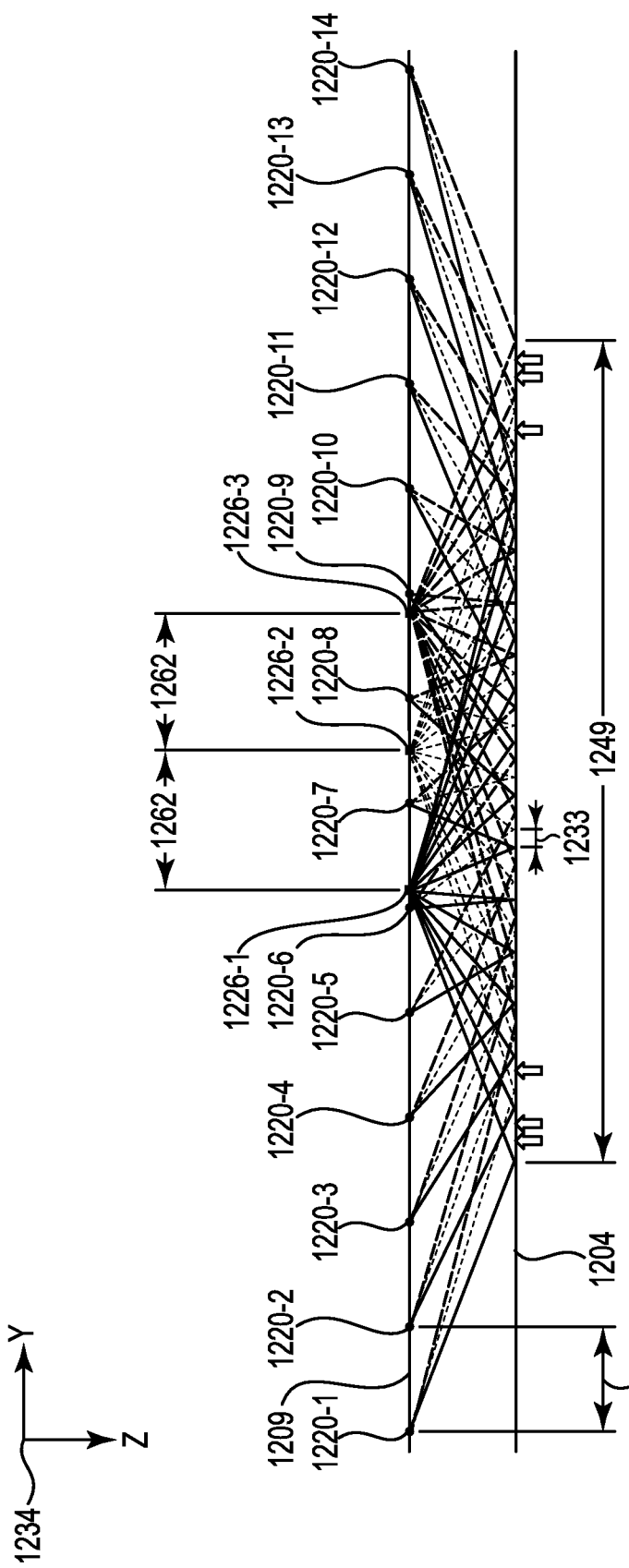
FIG. 12 illustrates a front or rear (yz-plane) view of a configuration of an array of seismic source elements and streamers where two of three seismic source elements are positioned outside the innermost two streamers.

FIG. 12 illustrates a front or rear (yz-plane 1234) view of a configuration of seismic source elements 1226-1, 1226-2, and 1226-3 and streamers 1220-1, 1220-2, 1220-3, 1220-4, 1220-5, 1220-6, 1220-7, 1220-8, 1220-9, 1220-10, 1220-11, 1220-12, 1220-13, and 1220-14 where two of three seismic source elements 1226-1, 1226-2, and 1226-3 are positioned outside the innermost two streamers 1220-7 and 1220-8. In contrast to the example of FIG. 11, the cross-line source separation 1262 is wider than the cross-line source separation 1161 such that the seismic source elements 1226-1 and 1226-3 are positioned outside the streamers 1220-7 and 1220-8. The cross-line source separation 1262 can be analogous to the cross-line source separation 1062 illustrated in FIG. 10.

In FIG. 12, the cross-line source separation 1262 is based on the cross-line streamer separation 1231 (L). The cross-line source separation 1262 is based on the sum of the integer (k) and the inverse of the quantity of the seismic source elements (1/S) multiplied by the cross-line streamer separation 1231 (L) as represented by the expression $(k+1/S)L$. As in the example of FIG. 11, the cross-line streamer separation 1231 is 150 m. In the example of FIG. 12, the integer (k) is one and there are three seismic source elements 1226. Thus, the cross-line source separation 1262 is $(1+\frac{1}{3})$*150 m, or 200 m. The seismic source element 1226-1 is positioned 25 m to the right of the streamer 1220-6, the seismic source element 1226-2 is positioned 75 m to right of the streamer 1220-7 (midway between the streamers 1220-7 and 1220-8) and the seismic source element 1226-3 is positioned 25 m to the left of the streamer 1220-9.

Even though the cross-line source separation 1262 is wider than the cross-line source separation 1161, the nominal cross-line subline separation 1233 is still one sixth of the cross-line streamer separation 1231 (L/6), or 25 m, as in the example of FIG. 11 without having to increase the quantity of streamers (N) or decrease the cross-line streamer separation (L) 1231. The subline coverage 1249 is 1,175 m, 150 m greater than the subline coverage 1148 in the example of FIG. 11. However, the subline coverage 1249 includes six zero fold sublines as indicated by the open vertical arrows.

Figure 13A:
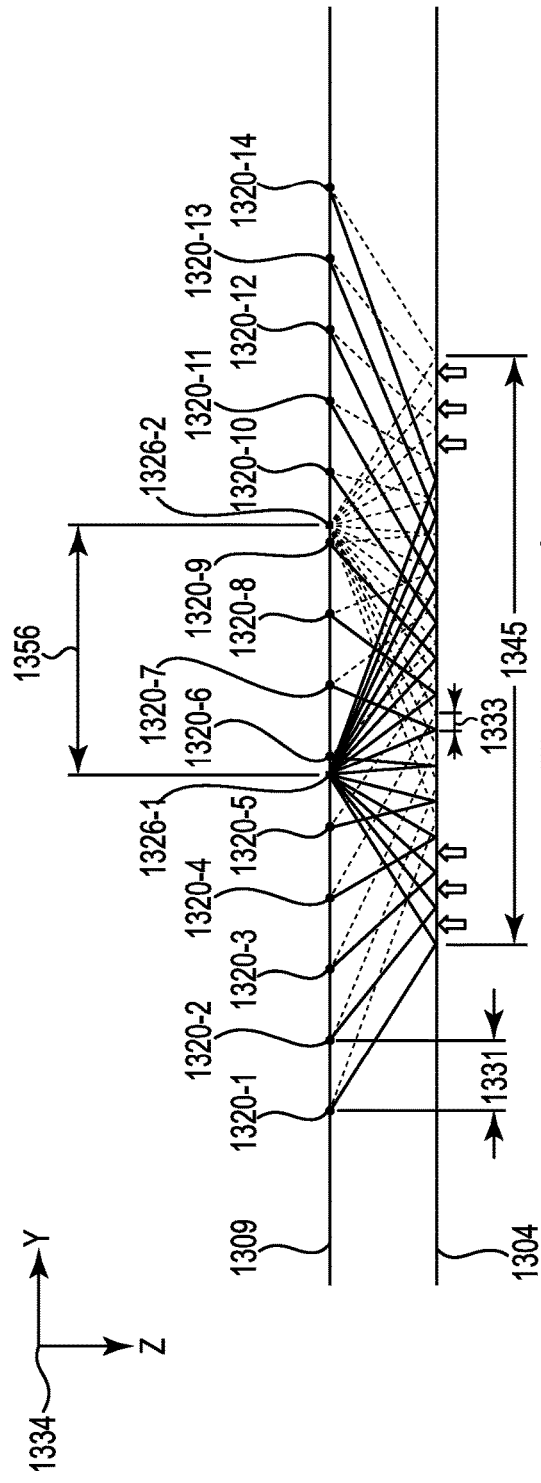
FIG. 13A illustrates a front or rear (yz-plane) view of a configuration of an array of seismic source elements and streamers where two seismic source elements are positioned outside the innermost four streamers.

FIG. 13A illustrates a front or rear (yz-plane 1334) view of a configuration of seismic source elements 1326-1 and 1326-2 and streamers 1320-1, 1320-2, 1320-3, 1320-4, 1320-5, 1320-6, 1320-7, 1320-8, 1320-9, 1320-10, 1320-11, 1320-12, 1320-13, and 1320-14 with two seismic source elements 1326-1 and 1326-2 positioned outside the innermost four streamers 1320-6, 1320-7, 1320-8, and 1320-9. FIG. 13A is the same as FIG. 7 and illustrates the same configuration of the fourteen streamers 1320-1 to 1320-14 and two seismic source elements 1326-1 and 1326-2. As in the example of FIG. 7, the cross-line streamer separation 1331 is 100 m, there are two seismic source elements 1326, and the integer (k) is three. Thus, the cross-line source separation 1356 is $(3+\frac{1}{2})$*100 m, or 350 m. The nominal cross-line subline separation 1333 is one quarter of the cross-line streamer separation 1331, or 25 m. The subline coverage 1345 is 825 m; however, the subline coverage 1345 includes six zero fold sublines as indicated by the open vertical arrows.

Figure 13B:
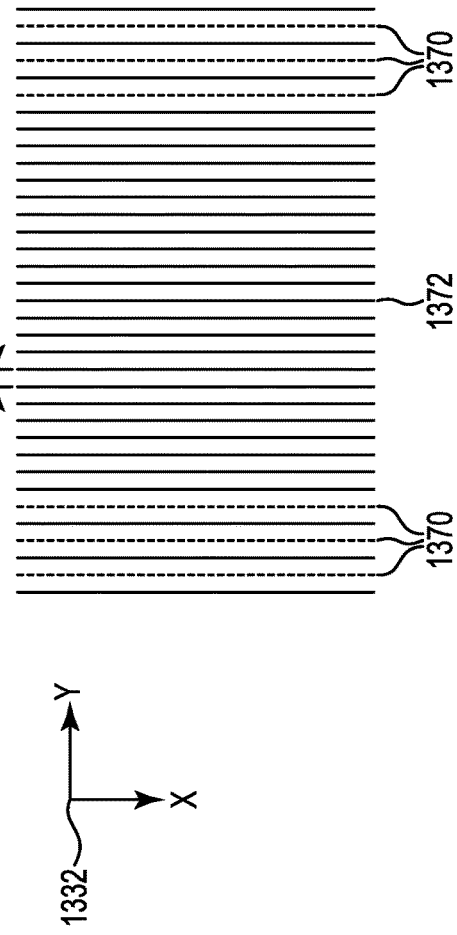
FIG. 13B illustrates a plan (yx-plane) view of sublines for consecutive actuations of seismic source elements associated with a configuration of an array of seismic source elements and streamers for one sail line.

FIG. 13B illustrates a plan (yx-plane 1332) view of sublines for consecutive actuations of seismic source elements 1326-1 and 1326-2 associated with a configuration of an array of seismic source elements 1326-1 and 1326-2 and streamers 1320 for one sail line. In FIG. 13B, the zero fold sublines 1370 are dashed and correspond to the vertical arrows illustrated in FIG. 13A. Full fold sublines, such as the full fold subline 1372, are solid and correspond to nominally recorded data corresponding to receiver-source midpoints illustrated in FIG. 13A. As used herein, "nominally recorded data" refers to situations where recorded data corresponds to points other than receiver-source midpoints.

FIG. 13B illustrates the gaps in the subline coverage 1345, represented by the zero fold sublines 1370, and indicated by the vertical arrows in FIG. 13A. A zero fold does not necessarily imply a complete lack of marine seismic survey data corresponding to the zero fold sublines 1370. Zero fold sublines can assume perfectly uniformed source and receiver geometry with parallel streamers. However, in practice seismic source elements, receivers, and streamers move around such that there may be some data recorded that correspond to the zero fold sublines. Very low or zero fold sublines can affect the cross-line resolution of the marine seismic survey data because very low or zero fold sublines may make negligible or no contributions to an overall seismic image in locations corresponding to the very low or zero fold sublines. As a result, a marine seismic image generated from the marine seismic survey data may have a lesser resolution at the edges of a sail than the cross-line resolution at the center of the sail line as illustrated in FIG. 13B.

Figure 14:
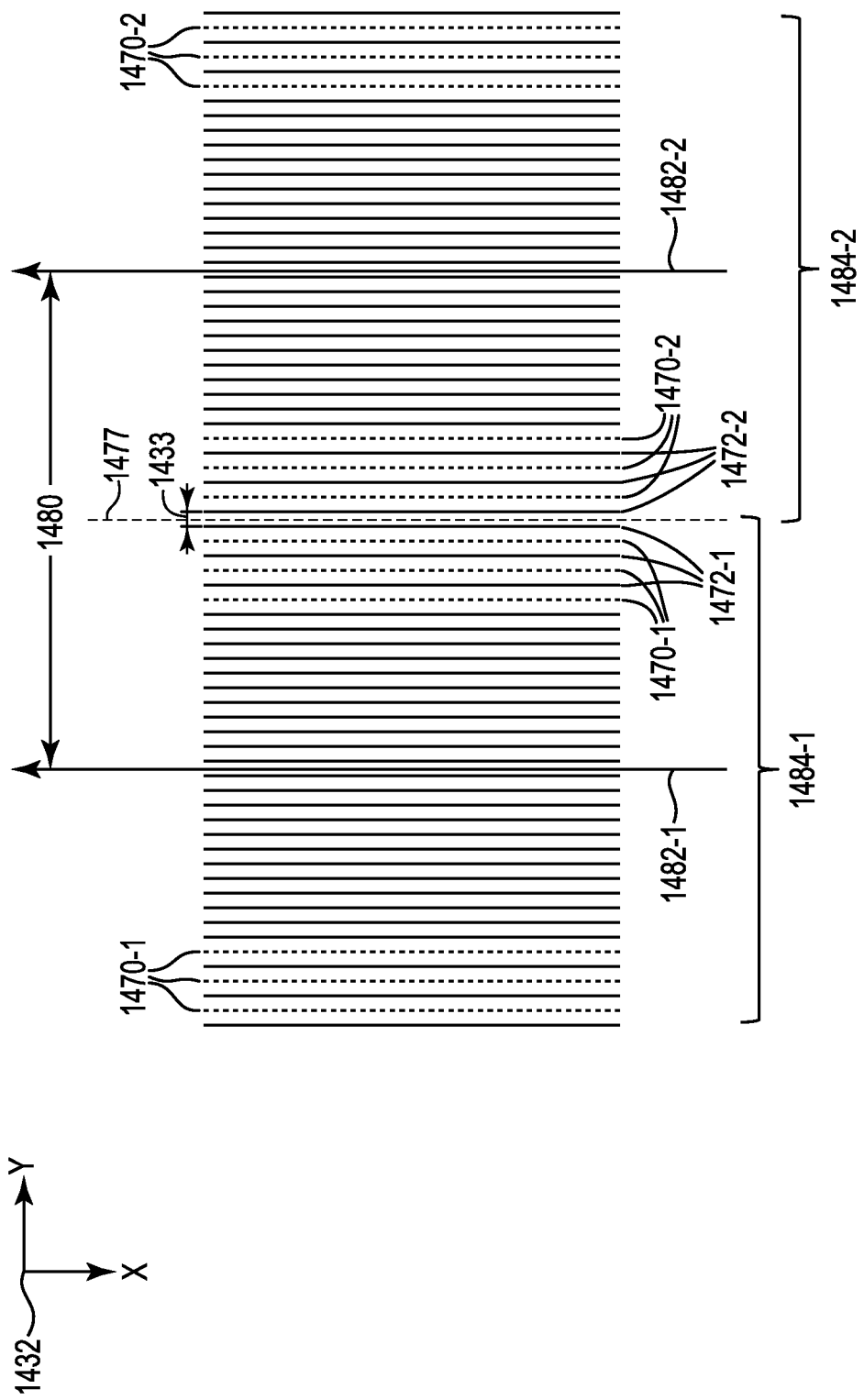
FIG. 14 illustrates a plan (yz-plane) view of sublines for two adjacent sail lines where the cross-line sail line separation is such that there is no overlap of the sublines.

FIG. 14 illustrates a plan or yx-plane 1432 of a cross-line sail line separation 1480 between two adjacent sail lines 1482-1 and 1482-2 such that there is no overlap of the sublines. As used herein, "cross-line sail line separation" refers to the distance in the cross-line direction between two adjacent sail lines. As used herein, "nominal cross-line sail line separation" refers to a cross-line sail line separation such that there is no overlap of the sublines corresponding to adjacent sail lines. The sublines illustrated in FIG. 14 correspond to the configuration of the streamers and seismic source elements illustrated in FIGS. 7 and 13A and two sets of the sublines illustrated in FIG. 13B placed side by side. However, FIG. 14 shows the sublines corresponding to the configuration of the streamers and seismic source elements illustrated in FIGS. 7 and 13A along two adjacent sail lines 1482-1 and 1482-2. The arrows on the sail lines 1482-1 and 1482-2 do not limit the sailing direction. The sail lines 1482-1 and 1482-2 can be oriented in opposing directions. The sublines corresponding to the sail line 1482-1 are identified by the bracket 1484-1 and the sublines corresponding to the sail line 1482-2 are identified by the bracket 1484-2. The vertical dashed line 1477 represents a midline halfway between the cross-line sail line separation 1480. In FIG. 14, the zero fold sublines 1470-1 and 1470-2 are dashed whereas the full fold sublines, such as the full fold sublines 1472-1 and 1472-2, are solid. The zero fold sublines 1470-1 and the full fold 1472-1 correspond to the sail line 1482-1 whereas the zero fold sublines 1470-2 and the full fold 1472-2 correspond to the sail line 1482-2.

As illustrated in FIG. 14, performing a marine seismic survey may include a cross-line sail line separation 1480 being a nominal cross-line sail line separation. The rightmost subline corresponding to the sail line 1482-1 is adjacent to the leftmost subline corresponding to the sail line 1482-2. The rightmost subline corresponding to the sail line 1482-1 may be spaced apart from the leftmost subline corresponding to the sail line 1482-2 by the nominal cross-line subline separation 1433. The nominal cross-line sail line separation can be the quantity of sublines multiplied by the cross-line subline separation for one sail line. Based on the configuration of the array of the streamers and seismic source elements illustrated in FIGS. 7 and 13A, in the example of FIG. 15 there are thirty-four fold sublines and the cross-line subline separation is 25 m such that the cross-line sail line separation 1480 is 850 m.

Although a zero fold does not necessarily imply a complete lack of marine seismic survey data corresponding to the zero fold sublines 1470-1 and 1470-2 as discussed above, very low or zero fold sublines can affect the cross-line resolution of the marine seismic survey data because very low or zero fold sublines may make negligible or no contributions to an overall seismic image in locations corresponding to the very low or zero fold sublines. As a result, a marine seismic image generated from the marine seismic survey data from two adjacent sail lines, such the sail lines 1482-1 and 1482-2, may have a lesser resolution at the edges of a combined surveyed area for both the sail lines 1482-1 and 1482-2 and at the center of the total survey area than the resolution at the center of the surveyed area corresponding to a particular sail line as illustrated in FIG. 14. Additional adjacent sail lines (not illustrated in FIG. 14) would cause an alternating pattern in the marine seismic survey image of higher resolution and lower resolution as well as alternating image quality in the cross-line direction.

FIG. 15A illustrates a plan (yz-plane 1532) view of sublines for two adjacent sail lines 1582-1 and 1582-2 where the cross-line sail line separation 1581 is such that there is overlap of the sublines. If a nominal cross-line sail line separation is used such that the sublines corresponding to one sail line do not overlap the sublines corresponding to an adjacent sail line as illustrated in FIG. 14. At least one embodiment can include a cross-line sail line separation 1581 that is less than the nominal cross-line sail line separation 1480 as illustrated in FIG. 14. Because the cross-line sail line separation 1581 that is less than the nominal cross-line sail line separation, some of the sublines corresponding to the sail line 1582-1 (identified by the bracket 1584-1) overlap some the sublines corresponding to the sail line 1582-2 (identified by the bracket 1584-2). Zero fold sublines corresponding to the sail line 1582-1 are spatially coincident with full fold sublines corresponding to the sail line 1582-2 and vice versa.

FIG. 15A shows the sublines corresponding along two adjacent sail lines 1582-1 and 1582-2 to the configuration of the array of streamers and seismic source elements illustrated in FIGS. 7 and 13A. The arrows on the sail lines 1582-1 and 1582-2 do not limit the sailing direction. The sail lines 1582-1 and 1582-2 can be oriented in opposing directions. The vertical dashed 1577 line represents a midline halfway between the cross-line sail line separation 1581. In FIG. 15A, the zero fold sublines 1570 are dashed whereas the full fold sublines, such as the full fold sublines 1572, are solid. No zero fold sublines, such as the zero fold sublines 1470-1 and 1470-2 illustrated in FIG. 14, are evident in the overlap zone between the adjacent sail lines 1582-1 and 1582-2.

The cross-line sail line separation 1581 can be based on the configuration of the streamers and seismic source elements. A particular configuration of the streamers and seismic source elements, such as those illustrated in FIGS. 7 and 13A, can cause a particular pattern of full fold sublines and zero fold sublines at the outer areas of each sail line Thus, the cross-line sail line separation 1581 can be such that some of the full fold sublines from one sail line complement some of the zero fold sublines from an adjacent sail line, and vice versa.

As illustrated by the example of FIG. 15A, the full fold sublines corresponding to the sail line 1582-1 complement, or "fill in," the zero fold sublines corresponding to the sail line 1582-2. Similarly, the full fold sublines corresponding to the sail line sail line 1581-2 complement, or "fill in," the zero fold sublines corresponding to the sail line 1582-1. Thus, the cross-line resolution and seismic image quality can be maintained across the overlap zone between the adjacent sail lines 1582-1 and 1582-2. However, the leftmost zero fold sublines corresponding to the sail line 1582-1 and the rightmost zero fold sublines corresponding to the sail line 1582-2 can be complemented, or be "filled in," by full fold sublines corresponding to additional adjacent sail lines (not illustrated in FIG. 15A).

To have the full fold sublines corresponding to the sail line sail line 1581-2 complement, or "fill in," the zero fold sublines corresponding to the sail line 1581-1 and vice versa, the cross-line sail line separation 1581 can be the quantity of full fold sublines between the adjacent sail lines 1582-1 and 1582-2 multiplied by the cross-line subline separation. In the example of FIG. 15, there are twenty-eight full fold sublines between the adjacent sail lines 1582-1 and 1582-2 and the cross-line subline separation is 25 m such that the cross-line sail line separation 1581 is 700 m. The cross-line sail line separation 1581 can be the same as the nominal cross-line sail line separation for the configuration of the streamers and seismic source elements as in the example of FIG. 3 along adjacent sail lines as in the example of FIG. 14.

FIG. 15B illustrates a plan (yx-plane 1532) view of sublines for two adjacent sail lines 1582-1 and 1582-2 where the cross-line sail line separation 1581 is such that there is overlap of the sublines. FIG. 15B shows the same sail line separation 1581 as FIG. 15A but the sublines corresponding to the sail line 1582-1 (identified by the bracket 1584-1) are illustrated above the sublines corresponding to the sail line 1582-2 (identified by the bracket 1584-2). The zero fold sublines 1570-1 and the full fold sublines 1572-1 correspond to the sail line 1582-1 whereas the zero fold sublines 1570-2 and the full fold sublines 1572-2 correspond to the sail line 1582-2. FIG. 15B illustrates that the full fold sublines 1572-1 complement, or "fill in," the zero fold sublines 1570-2 and the full fold sublines 1572-2 complement, or "fill in," the zero fold sublines 1570-1.

At least one embodiment can include inducing a streamer spread angle that is greater than zero degrees to fan out the streamers. Fanning out the streamers can ensure that receivers located at the back ends of the streamers contribute to all sublines corresponding to a particular sail line despite any prevailing conditions. When a streamer spread angle is induced, the cross-line source separation can be based on the nominal cross-line streamer separation.

Figure 16:
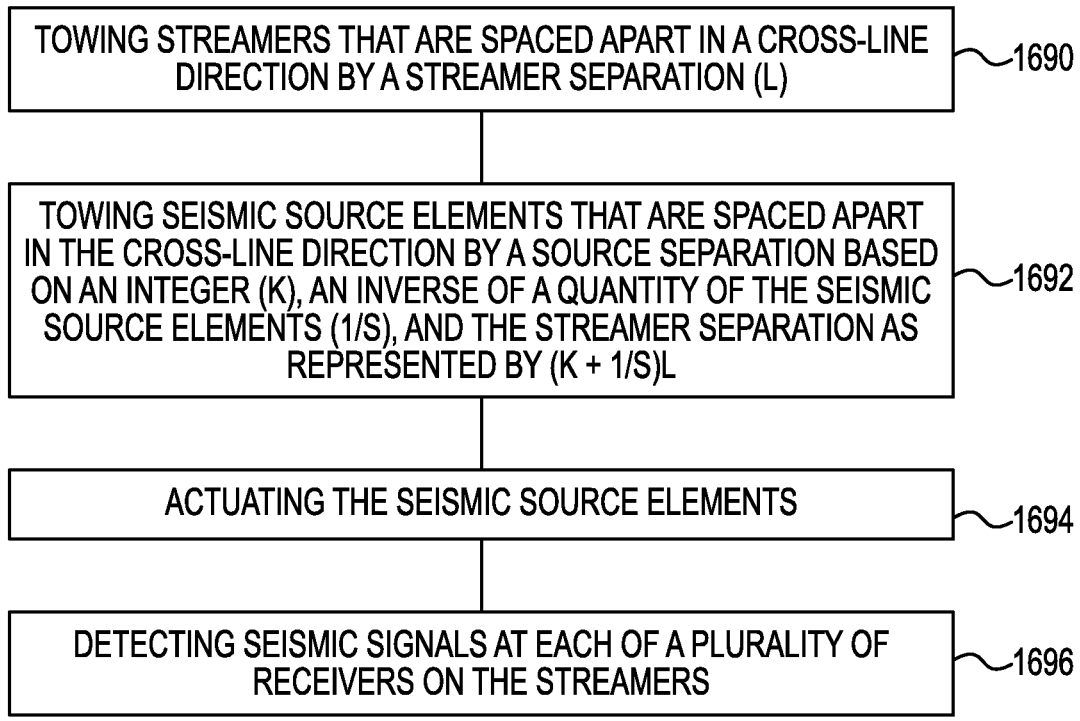
FIG. 16 illustrates a method for a marine seismic survey.

FIG. 16 illustrates a method for a marine seismic survey. The method can comprise, at block 1690, towing streamers that are spaced apart in a cross-line direction by a streamer separation (L). At block 1692, the method can include towing seismic source elements that are spaced apart in the cross-line direction by a source separation based on an integer (k), an inverse of a quantity of the seismic source elements (1/S), and the streamer separation as represented by (k+1/S)L.

Although not illustrated in FIG. 16, the method can include determining a value of the integer (k) based on a quantity of the streamers (N). The method can include determining a value of the integer (k) between one and one less than a quantity of the plurality of streamers (N−1), inclusive, between one and half of the quantity of the plurality of streamers (N/2), inclusive, or between one and half of one less than the quantity of the plurality of streamers ((N−1)/2), inclusive.

Although not illustrated in FIG. 16, the streamers and the seismic source elements can be towed by a marine survey vessel. The streamers can be towed by a first marine survey vessel and the seismic source elements can be towed by a second marine survey vessel. The streamers can be towed by a first marine survey vessel, a first one of the seismic source elements can be towed by a second marine survey vessel, and a second one of the seismic source elements can be towed by a third marine survey vessel.

At block 1694, the method can include actuating the seismic source elements. At block 1696, the method can include detecting seismic signals at each of a plurality of receivers on the streamers.

Figure 17:
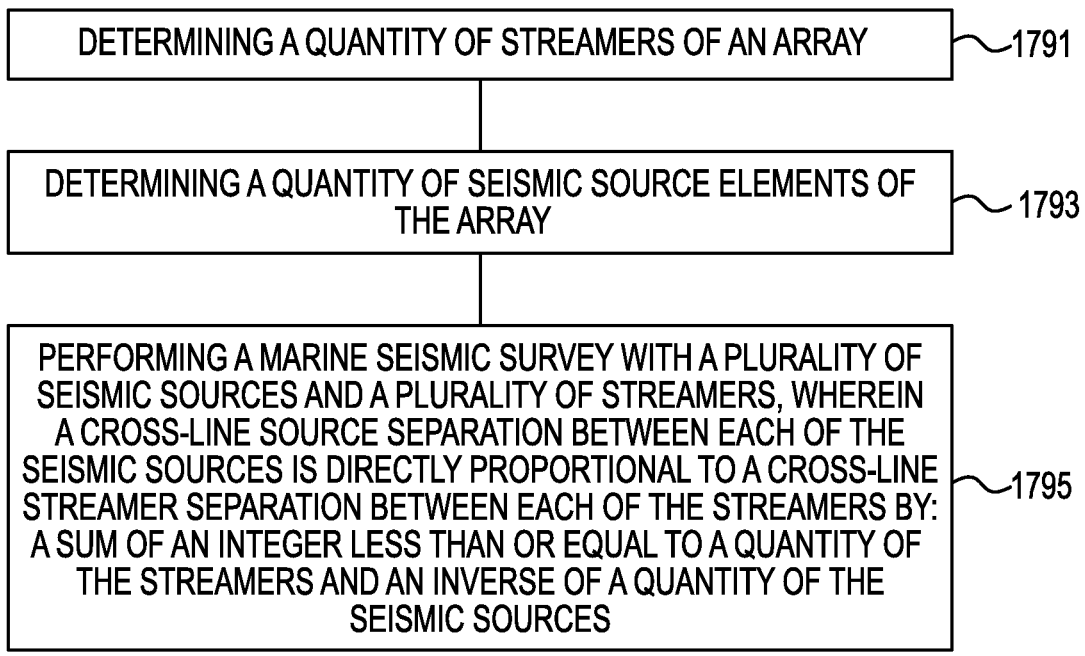
FIG. 17 illustrates a method for a marine seismic survey.

FIG. 17 illustrates a method for a marine seismic survey. The method can include, at block 1791, determining a quantity of streamers of an array. At block 1793, the method can include determining a quantity of seismic source elements of the array. At block 1795, the method can include performing a marine seismic survey with a plurality of seismic source elements and a plurality of streamers, wherein a cross-line source separation between each of the seismic source elements is directly proportional to a cross-line streamer separation (L) between each of the streamers. The cross-line source separation can be directly proportional to the cross-line streamer separation (L) by a sum of an integer (k) less than or equal to a quantity (N) of the plurality of the streamers and an inverse of a quantity of the seismic source elements (1/S).

Although not illustrated in FIG. 17, the method can include determining a value of the integer (k) for a particular subline coverage. The value of the integer (k) can be increased to increase a subline coverage. The method can include maintaining a marine seismic survey resolution while increasing the cross-line source separation, without increasing the quantity (N) of the plurality of the streamers.

Although not illustrated in FIG. 17, the marine seismic survey can be performed along two or more adjacent sail lines. A cross-line sail line separation between the two adjacent sail lines can be such that a subline of one of the two adjacent sail lines complements a subline of another one of the two adjacent sail lines. The cross-line sail line separation between the two adjacent sail lines can be such that a full fold subline of one of the two adjacent sail lines complements a zero fold subline of another one of the two adjacent sail lines. A cross-line subline separation between the complementing sublines of the one of the two adjacent sail lines and the complementing sublines of the other one of the two adjacent sail lines can be maintained. The method can include subtracting a predicted multiple from the marine seismic survey data.

In accordance with a number of embodiments of the present disclosure, a geophysical data product may be produced. Geophysical data may be obtained and stored on a non-transitory, tangible computer-readable medium. The processed data can be recorded on a non-transitory machine-readable medium thereby creating the geophysical data product. The geophysical data product may include, for example, field data recorded during a survey utilizing the above-described techniques. In some instances, geophysical analysis may be performed on the geophysical data product offshore according to techniques described herein or known in the art, and stored on a computer-readable medium, to produce an enhanced geophysical data product.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

The invention claimed is:

1. A method, comprising:
determining a source separation in a cross-line direction of a plurality of seismic source elements to be used in a marine survey based on a positive integer (k), an inverse of a quantity of the seismic source elements (1/S), and a streamer separation (L) in a cross-line direction of a plurality of streamers to be used in the marine survey.

2. The method of claim 1, further comprising determining a value of the positive integer (k) based on a quantity of the streamers (N).

3. The method of claim 1, further comprising determining a value of the positive integer (k) between one and one less than a quantity of the plurality of streamers (N−1), inclusive.

4. The method of claim 1, further comprising determining a value of the positive integer (k) between one and half of the quantity of the plurality of streamers (N/2), inclusive.

5. The method of claim 1, further comprising determining a value of the positive integer (k) between one and half of one less than the quantity of the plurality of streamers ((N−1)/2), inclusive.

6. The method of claim 1, further comprising, during the marine survey, detecting seismic signals at each of a plurality of receivers on the plurality of streamers and recording the seismic signals or data representative thereof in at least one non-transitory computer readable medium.

7. The method of claim 1, further comprising determining the source separation based on an average cross-line streamer separation of the plurality of streamers.

8. The method of claim 1, further comprising determining the source separation based on a relationship between the positive integer (k), the inverse of the quantity of the seismic source elements (1/S), and the streamer separation (L) as represented by (k+1/S)L.

9. A method, comprising:
    determining an arrangement of a plurality of seismic source elements such that a cross-line source separation between each of the seismic source elements is directly proportional to a cross-line streamer separation (L) between each streamer of a plurality of streamers by a sum (k+1/S);
    where k is a positive integer less than or equal to a total number of streamers in the plurality of streamers, and S is equal to a total number of seismic source elements in the plurality of seismic source elements.

10. The method of claim 9, wherein the plurality of seismic source elements comprises a first seismic source sub-array, and wherein the method further comprises determining a different cross-line source separation between the first seismic source sub-array and a second seismic source sub-array comprising a different plurality of seismic source elements based on:
    the positive integer (k);
    the cross-line streamer separation (L); and
    an inverse of a quantity of seismic source sub-arrays $(1/S_A)$.

11. The method of claim 9, further comprising determining the cross-line source separation such that the cross-line source separation is greater than the cross-line streamer separation (L).

12. The method of claim 9, further comprising determining the cross-line source separation based on an average cross-line streamer separation between the plurality of streamers.

13. A method of forming a seismic source array, comprising:
    forming the seismic source array such that a cross-line source separation between two adjacent seismic source elements is directly proportional to a cross-line streamer separation (L) between a plurality of streamers by a sum (k+1/S);
    where k is a positive integer less than or equal to a quantity (N) of the plurality of streamers and S is a quantity of the plurality of seismic source elements.

14. The method of claim 13, further comprising determining a value of the positive integer (k) for a particular subline coverage.

15. The method of claim 13, further comprising increasing a subline coverage via increasing a value of the positive integer (k).

16. The method of claim 13, further comprising maintaining a marine seismic survey resolution while increasing the cross-line source separation without increasing the quantity (N) of the plurality of streamers.

17. The method of claim 13, further comprising performing a marine seismic survey using the seismic source array along two adjacent sail lines using a cross-line sail line separation between the two adjacent sail lines such that a subline of one of the two adjacent sail lines complements a subline of another one of the two adjacent sail lines.

18. The method of claim 13, further comprising performing a marine seismic survey using the seismic source array along two adjacent sail lines using a cross-line sail line separation between the two adjacent sail lines such that a full fold subline of one of the two adjacent sail lines complements a zero fold subline of another one of the two adjacent sail lines.

19. The method of claim 18, further comprising maintaining a cross-line subline separation between the complementing sublines of the one of the two adjacent sail lines and the complementing sublines of the other one of the two adjacent sail lines.

* * * * *